(12) United States Patent
Wiebe et al.

(10) Patent No.: US 11,783,222 B2
(45) Date of Patent: Oct. 10, 2023

(54) QUANTUM ALGORITHMS FOR SUPERVISED TRAINING OF QUANTUM BOLTZMANN MACHINES

(71) Applicant: Microsoft Technology Licensing, LLC, Redmond, WA (US)

(72) Inventors: Nathan O. Wiebe, Redmond, WA (US); Alexei Bocharov, Redmond, WA (US); Paul Smolensky, Timonium, MD (US); Matthias Troyer, Clyde Hill, WA (US); Krysta Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1007 days.

(21) Appl. No.: 16/446,511

(22) Filed: Jun. 19, 2019

(65) Prior Publication Data

US 2021/0065037 A1 Mar. 4, 2021

Related U.S. Application Data

(60) Provisional application No. 62/804,576, filed on Feb. 12, 2019.

(51) Int. Cl.
*G06N 20/00* (2019.01)
*G06N 10/00* (2022.01)

(52) U.S. Cl.
CPC .............. *G06N 20/00* (2019.01); *G06N 10/00* (2019.01)

(58) Field of Classification Search
CPC ........ G06N 20/00; G06N 10/00; G06N 5/022; G06N 3/08; G06N 3/0445; G06N 3/0472
See application file for complete search history.

(56) References Cited

U.S. PATENT DOCUMENTS

| | | | |
|---|---|---|---|
| 6,678,450 B1 * | 1/2004 | Franson | B82Y 10/00 359/326 |
| 2017/0364796 A1 * | 12/2017 | Wiebe | G06N 3/0445 |
| 2018/0165601 A1 * | 6/2018 | Wiebe | G06F 17/11 |
| 2018/0308007 A1 * | 10/2018 | Amin | G06N 3/0445 |
| 2019/0266510 A1 * | 8/2019 | Yarkoni | G06N 3/0472 |
| 2020/0044137 A1 * | 2/2020 | Schueffelgen | H01L 39/025 |
| 2020/0097820 A1 * | 3/2020 | Song | G06N 3/0454 |
| 2020/0401916 A1 * | 12/2020 | Rolfe | G06N 5/04 |

OTHER PUBLICATIONS

Layeb, "A hybrid quantum inspired harmony search algorithm for 0-1 optimization problems", Journal of Computational and Applied Mathematics 253 (2013) 14-25. (Year: 2013).*

Prince, et al., "Optimality: From Neural Networks to Universal Grammar", Published in Science, vol. 275, Issue 5306, Mar. 14, 1997, pp. 1604-1610.

(Continued)

*Primary Examiner* — Dave Misir
(74) *Attorney, Agent, or Firm* — Alleman Hall Creasman & Tuttle LLP

(57) ABSTRACT

A method of training a quantum computer employs quantum algorithms. The method comprises loading, into the quantum computer, a description of a quantum Boltzmann machine, and training the quantum Boltzmann machine according to a protocol, wherein a classification error is used as a metric for the protocol.

11 Claims, 13 Drawing Sheets

(56) References Cited

OTHER PUBLICATIONS

Ackley, et al., "A Learning Algorithm for Boltzmann Machines", Published in Cognitive Science vol. 9, Issue 1, Jan. 1, 1985, pp. 147-169.
Aïmeur, et al., "Machine Learning in a Quantum World", In Proceedings of Conference of the Canadian Society for Computational Studies of Intelligence, Jun. 7, 2006, pp. 431-442.
Amin, et al., "Quantum Boltzmann Machine", In Physical Review X vol. 8, Issue 2, May 23, 2018, 11 Pages.
Tang, Ewin., "A Quantum-Inspired Classical Algorithm for Recommendation Systems", In Repository of arXiv, arXiv:1807.04271v1, Jul. 10, 2018, pp. 1-36.
Berry, et al., "Efficient Quantum Algorithms for Simulating Sparse Hamiltonians", In Proceedings of Communications in Mathematical Physics, vol. 270, Issue 2, Mar. 2007, 9 Pages.
Boyd, et al., "Convex Optimization", Published by Cambridge University Press, Mar. 8, 2004, 730 Pages.
Brassard, et al., "Quantum Amplitude Amplification and Estimation", Published in Contemporary Mathematics, vol. 305, May 2, 2002, 32 Pages.
Cho, et al., "Incremental Parsing in a Continuous Dynamical System: Sentence Processing in Gradient Symbolic Computation", Published in Linguistics Vanguard, vol. 3, Issue 1, Jan. 1, 2017, 10 Pages.
Gallavotti, Giovanni, "Statistical Mechanics: A Short Treatise", Published by Springer, Jan. 1999, 359 Pages.
Gilyén, et al., "Optimizing Quantum Optimization Algorithms Via Faster Quantum Gradient Computation", In Journal of the Computing Research Repository, Nov. 2017, 60 Pages.
Glover, et al., "Handbook of Metaheuristics", Published by Springer Science & Business Media, vol. 57, Apr. 11, 2006, 560 Pages.
Gosset, et al., "Universal Adiabatic Quantum Computation via the Space-Time Circuit-to-Hamiltonian Construction", In Physical Review Letters vol. 114, Issue 14, Apr. 6, 2015, pp. 1-14.
Hopfield, John J., "Neural Networks and Physical Systems With Emergent Collective Computational Abilities", In Proceedings of the National Academy of Sciences, vol. 79, Issue 8, Apr. 1982, pp. 2554-2558.
Jordan, et al., "Quantum Algorithms for Fermionic Quantum Field Theories", In arXiv preprint arXiv:1404.7115, Apr. 28, 2014, 29 Pages.
Jordan, et al., "Quantum Algorithms for Quantum Field Theories", Published in Science, vol. 336, Issue 6085, Jun. 1, 2012, pp. 1130-1133.
Jurafsky, et al., "Speech and Language Processing", Published by Pearson London, vol. 3, Edition 2, Jan. 2014, 558 Pages.
Kadowaki, et al., "Quantum Annealing in the Transverse Ising Model", In Physical Review E, vol. 58, Issue 5, Nov. 1, 1998, pp. 5355-5363.
Kerenidis, et al., "Quantum Gradient Descent for Linear Systems and Least Squares", In arXiv preprint arXiv:1704.04992, Apr. 17, 2017, pp. 1-26.
Kieferová, et al., "Tomography and Generative Data Modeling via Quantum Boltzmann Training", In arXiv preprint arXiv:1612.05204, Dec. 16, 2016, 13 Pages.
Kirkpatrick, et al., "Optimization by Simulated Annealing", Published in Science, New Series, vol. 220, Issue 4598, May 13, 1983, pp. 671-680.
Legendre, et al., "Harmonic Grammar—A Formal Multi-Level Connectionist Theory of Linguistic Well-Formedness: Theoretical Foundations", In Computer Science Technical Reports, ICS Technical Report #90-5, CU-CS-465-90, May 1, 1990, 16 Pages.
Lloyd, Seth, "Universal Quantum Simulators", Published in Science, vol. 273, Aug. 23, 1996, pp. 1073-1078.
Pater, Joe, "Weighted Constraints in Generative Linguistics", In Cognitive Science, vol. 33, Issue 6, Mar. 24, 2009, pp. 999-1035.
Wiebe, et al., "Quantum Algorithms for Nearest-Neighbor Methods for Supervised and Unsupervised Learning", In Repository of arXiv, arXiv:1401.2142v1, Jan. 9, 2014, 23 Pages.
Prince, et al., "Optimality Theory: Constraint Interaction in Generative Grammar", In ROA Version, Rutgers University and University of Colorado at Boulder, Aug. 2002, 262 Pages.
Rebentrost, et al., "Quantum Support Vector Machine for Big Data Classification", In Physical Review Letters, vol. 113, Issue 13, Sep. 25, 2014, 5 Pages.
Shor, Peter W., "Polynomial-Time Algorithms for Prime Factorization and Discrete Logarithms on a Quantum Computer", In SIAM Review, vol. 41, Issue 2, Jan. 1999, pp. 303-332.
Smolensky, Paul, "Harmonic Grammars for Formal Languages", In Proceedings of Advances in Neural Information Processing Systems 5, Nov. 30, 1992, pp. 847-854.
Smolensky, Paul, "Information Processing in Dynamical Systems: Foundations of Harmony Theory", In Book Parallel Distributed Processing: Explorations in the Microstructure of Cognition, vol. 1, Feb. 1986, pp. 194-281.
Smolensky, et al., "Optimization and Quantization in Gradient Symbol Systems: A Framework for Integrating the Continuous and the Discrete in Cognition", In Proceedings of Cognitive Science vol. 38, Issue 6, Aug. 2014, pp. 1102-1138.
Smolensky, Paul, "Symbolic Functions from Neural Computation", In Proceedings of Philosophical Transactions of the Royal Society A: Mathematical, Physical and Engineering Sciences, vol. 370, Jul. 28, 2012, pp. 3543-3569.
Smolensky, Paul, "Tensor Product Variable Binding and the Representation of Symbolic Structures in Connectionist Systems", In Journal of Artificial Intelligence, vol. 46, Issue 1-2, Nov. 1, 1990, pp. 159-216.
Wiebe, et al., "Quantum Inspired Training for Boltzmann Machines", In Repository of arXiv, arXiv:1507.02642v1, July 9, 2015, 18 Pages.
Somma, et al., "Quantum Simulations of Classical Annealing Processes", In Physical Review Letters vol. 101, Issue 13, Sep. 26, 2008, 4 Pages.
Stroock, Daniel W., "An Introduction to Markov Processes", Published by Springer Science & Business Media, vol. 230, Oct. 28, 2013, 186 Pages.
Whitfield, et al., "Simulation of Electronic Structure Hamiltonians Using Quantum Computers", Published in Molecular Physics vol. 109, Issue 5, Mar. 10, 2011, 22 Pages.
Wiebe, et al., "Quantum Deep Learning", In Journal of the Computing Research Repository, Dec. 2014, pp. 1-34.
Farhi, et al., "Quantum Computation by Adiabatic Evolution," In Repository of arXiv, arXiv:quant-ph/0001106, Jan. 28, 2000, pp. 1-24.
Wiebe, et al., "Quantum Language Processing", In Repository of arXiv, arXiv:1902.05162v1, Feb. 13, 2019, 23 Pages.
Gilyén, et al., "Quantum-Inspired Low-Rank Stochastic Regression with Logarithmic Dependence on the Dimension", In Repository of arXiv, arXiv:1811.04909v1, Nov. 12, 2018, pp. 1-10.
Tang, Ewin., "Quantum-Inspired Classical Algorithms for Principal Component Analysis and Supervised Clustering", In Repository of arXiv, arXiv:1811.00414v1, Oct. 31, 2018, 5 Pages.
Wiebe, et al., "Generative Training of Quantum Boltzmann Machines with Hidden Units", In repository of arXiv:1905.09902, May 23, 2019, 32 Pages.
Chiara, et al., "Quantum Computational Semantics on Fock Space", In International Journal of Theoretical Physics, vol. 44, Issue 12, Dec. 1, 2005, pp. 2219-2230.
"International Search Report and Written Opinion Issued in PCT Application No. PCT/US20/015516", dated May 28, 2020, 13 Pages.
Ryabinkin, et al., "Constrained Variational Quantum Eigensolver: Quantum Computer Search Engine in the Fock Space", In Repository of arXiv:1806.00461v1, Jun. 1, 2018, 7 Pages.
Kieferová, et al., "Tomography and Generative Training with Quantum Boltzmann Machines", In Journal of Physical Review A, vol. 96, Issue 6, Dec. 22, 2017, 13 Pages.

\* cited by examiner

QUANTUM ALGORITHMS FOR SUPERVISED TRAINING OF QUANTUM BOLTZMANN MACHINES

CROSS-REFERENCE TO RELATED APPLICATIONS

This application claims the benefit of U.S. Provisional Application No. 62/804,576 entitled "QUANTUM ALGORITHMS FOR SUPERVISED TRAINING OF QUANTUM BOLTZMANN MACHINES" and filed on Feb. 12, 2019, which is hereby incorporated herein by reference in its entirety.

FIELD

This application relates generally to quantum computing.

SUMMARY

In this disclosure, example embodiments for providing a representation of a linguistic structure (referred to herein as a "Fock-space representation") that allows one to embed problems in language processing into small quantum devices. A formalism for understanding both classical as well as quantum linguistic problems is also disclosed. Both of those are phrased as a Harmony optimization problem that can be solved on a quantum computer, which is shown to be related to classifying vectors using quantum Boltzmann machines. Also disclosed is a new training method for learning quantum Harmony operators that describe a language. This provides new example techniques for training quantum Boltzmann machines that require no approximations and works in the presence of hidden units. It is also shown that quantum language processing is BQP-complete, meaning that it is polynomially equivalent to the circuit model of quantum computing which implies that quantum language models are richer than classical models unless BPP=BQP. It also implies that, under certain circumstances, quantum Boltzmann machines are more expressive than classical Boltzmann machines. Finally, the performance of example embodiments are examined. In that examination, it is shown that the example methods are capable of rapidly parsing even non-trivial grammars.

In particular embodiments, embodiments of a new approach for training a class of quantum neural networks called quantum Boltzmann machines are disclosed. In particular examples, methods for supervised training of a quantum Boltzmann machine are disclosed using an ensemble of quantum states that the Boltzmann machine is trained to replicate. Unlike existing approaches to Boltzmann training, example embodiments as disclosed herein allow for supervised training even in cases where only quantum examples are known (and not probabilities from quantum measurements of a set of states). Further, this approach does not require the use of approximations such as the Golden-Thompson inequality.

BRIEF DESCRIPTION OF THE DRAWINGS

FIG. 6 is a flow chart showing an example method for finding a gradient of parameters of the Boltzmann machine that are used to model the quantum data that the machine learning algorithm, as disclosed herein, is trained with.

DETAILED DESCRIPTION

I. General Considerations

Figure 1:
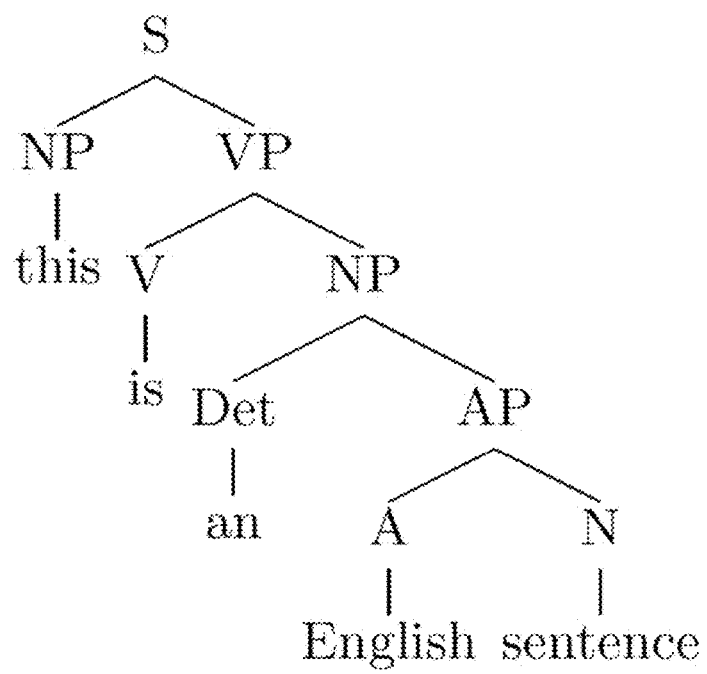
FIG. 1 shows a schematic block diagram of an example parse tree.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction

This paper develops an approach to natural language processing for quantum computing. The approach is based in artificial neural networks, because like quantum computers, neural network computers are dynamical systems with state spaces that are high-dimensional vector spaces. The method proposed here follows a general neural network framework for artificial intelligence and cognitive science called Gradient Symbolic Computation (GSC). See, e.g., Paul Smolensky and Geraldine Legendre, "The harmonic mind: From neural computation to Optimality-Theoretic grammar," 2 vols (Cambridge, Mass., MIT Press, 2006); Paul Smolensky, Matthew Goldrick, and Donald Mathis, "Optimization and quantization in Gradient Symbol Systems: A framework for integrating the continuous and the discrete in cognition," Cognitive Science, 38(6):1102-1138 (2014). Since GSC takes its starting point from quantum mechanics, this work amounts to the closing of a conceptual circle.

Quantum computation has in recent years been applied to address a host of problems in cryptography, simulation of physical systems, and machine learning. The advantages of these methods stem from a number of different sources, including a quantum computer's ability to manipulate exponentially large state vectors efficiently and manipulate quantum interference to improve on statistical sampling techniques. While techniques such as quantum gradient descent and amplitude amplification could be used to provide advantages to performing gradient symbolic computation for language processing, as yet this application remains underdeveloped and furthermore the challenges of preparing the necessary states on a quantum computer makes direct applications of these techniques challenging. For this reason, new representations for language would be highly desirable for applications in language processing.

This disclosure addresses at least two aspects of language processing: the generation of grammatical symbol sequences (along with their constituent structure parse trees), and the determination of the grammaticality of a given symbol sequence, given a grammar. In the disclosure, after the relevant aspects of Gradient Symbolic Computation are summarized in Section III, a representational schema for encoding parse trees in a quantum computer is proposed in Section IV, which identifies a connection between language processing and quantum error correction. In Section V, the Hamiltonian of the proposed quantum computer—a type of Boltzmann machine—is related to the grammar that it processes. Then Section VIII takes up the problem of learning the parameters of a quantum computer that processes according to an unknown grammar. Both the unsupervised and supervised learning problems are treated, and the complexity of the proposed learning algorithms are presented. Section VI presents numerical simulations of the generation of sentences in formal languages, which are specified by a given set of symbol-rewriting rules. This amounts to an optimization problem, because in Gradient Symbolic Computation, the grammatical sentences are those that maximize a well-formedness measure called Harmony. Harmony values are physically realized as expectation values of the negative Hamiltonian of the quantum computer.

It should be emphasized that the analyses of supervised learning presented here (in particular, the computation of the gradient in Theorem 4 and the complexity result in Theorem 5) are not restricted to language processing: they apply to supervised training of any quantum Boltzmann machine.

III. Tensor Product Representations

The core of the neural network framework deployed here, Gradient Symbolic Computation (GSC), is a general technique called Tensor Product Representation (TPR) for embedding complex symbol structures in vector spaces. See, e.g., Paul Smolensky, "Tensor product variable binding and the representation of symbolic structures in connectionist systems," Artificial intelligence, 46(1-2):159-216 (1990). For the language applications, the relevant type of symbol structure is a binary parse tree, a structure that makes explicit the grouping of words into small phrases, the grouping of smaller phrases into larger phrases, and so on recursively up to the level of complete sentences, as in $[_s [_{NP}$ this$][_{VP} [_V$ is$][_{NP} [_{Det}$ an$][_{AP} [_A$ English$][_N$ sentence$]]]]]$. Dan Jurafsky and James H Martin, Speech and language processing, volume 3, Pearson London, 2d edition (2014). This bracketed string denotes the binary tree shown in FIG. 1. Each labeled node in the tree is a constituent. In particular, FIG. 1 shows a schematic block diagram 100 of a parse tree for this is an English sentence; in this example parse tree, S=sentence, N=noun, V=verb, Det=determiner, A=adjective, P=phrase.

In one type of TPR embedding—which uses 'positional roles'—the vector that embeds a symbol structure (S) is the superposition of vectors embedding all the structure's constituents, and the vector embedding a constituent—a tree node labeled with a symbol—is the tensor product of a vector embedding the symbol ($s_i$) and a vector embedding the position of the node within the tree ($n_i$): $S=\Sigma_i s_i \otimes n_i$. A position in a binary tree can be identified with a bit string, such that 011 denotes the left (0) child of the right (1) child of the right child of the tree root. (An 'only child' is arbitrarily treated as a left child, and the root is identified with the empty string ε.) Thus in this positional-role TPR, the vector that embeds the parse tree for this is an English sentence is, in Dirac notation:

$$|\psi\rangle = |S\rangle |\varepsilon\rangle + |NP\rangle |0\rangle + |\text{this}\rangle |00\rangle + |VP\rangle |1\rangle + |V\rangle |01\rangle$$
$$+ |\text{is}\rangle |001\rangle + |NP\rangle |11\rangle + \ldots \quad (1)$$

The vectors $\{|S\rangle, |NP\rangle, |\text{this}\rangle, \ldots\}$ lie in a vector space $V_S$ hosting the embedded symbols, while the vectors $|\varepsilon\rangle, |0\rangle, |1\rangle, |01\rangle, \ldots$ lie in a vector space $V_N$ hosting the embedded nodes; $|\psi\rangle$ then lies in the tree-embedding space $V_T := V_S \otimes V_N$. Letting the embedding of nodes be recursive, one has $|101\rangle = |0\rangle |1\rangle |1\rangle$. Thus, letting $V_0$ be the vector space spanned by $|0\rangle, |1\rangle$, one has $\{|101\rangle\} \in V_0 \otimes V_0 \otimes V_0 = V_0^{\otimes 3}$. Similarly, one has that the vector space of embeddings of all nodes, $V_N$, is the direct sum of the vector spaces containing the vectors embedding nodes of all depths:

$$V_N = \bigoplus_{d=0}^{\infty} V_0^{\otimes d}, \quad (2)$$

as in a multi-particle state space where $V_0^{\otimes d}$ is the space of d particles (and $V_0$ is the single-particle state space). Here, d is the depth of a node in a tree.

It has been shown that using such TPRs and purely neural network computation, it is possible to compute families of recursive symbolic functions mapping binary trees to binary trees that are relevant to language processing. See, e.g., Paul Smolensky, "Symbolic functions from neural computation," Philosophical Transactions of the Royal Society—A: Mathematical, Physical and Engineering Sciences, in press (2012). (That is, for such a function $f$, a neural network can map the embedding of tree T to the embedding of tree $f(T)$.) For the family of functions that are the closure of the primitive tree-manipulating operations—extract left/right subtree, merge two subtrees into a single tree—linear neural networks suffice: such a function can be computed by a single matrix-multiplication. See Paul Smolensky and Geraldine Legendre, "The harmonic mind: From neural computation to Optimality-Theoretic grammar," 2 vols. Cambridge, Mass.: MIT Press (2006).

The general state in $V_T$ is not the embedding of a single tree but rather the weighted superposition of embeddings of trees. Thus if $|\psi\rangle$ is the embedding of the parse tree of this is an English sentence given in Equation 1, and $|\phi\rangle$ is the corresponding parse tree of this is an American sentence, then one state in $V_T$ is $|\chi\rangle = \frac{1}{2}(|\psi\rangle + |\phi\rangle)$. $|\chi\rangle$ embeds the Gradient Symbol Structure which is the parse tree of this is an ½(English+American) sentence; here node 00111 is labeled by the blend of two Gradient Symbols: ½ English and ½ American. In a general Gradient Symbolic Structure, nodes are labeled by linear combinations of symbols.

In Gradient Symbolic Computation, a grammar is a function that measures the degree of well-formedness of a state in a neural network; this is a Lyapunov function. In a Hopfield net, the network dynamics minimizes a function called the 'energy'; in GSC, the network dynamics maximizes a function H called the 'Harmony'. See John J Hopfield, "Neural networks and physical systems with emergent collective computational abilities," Proceedings of the National Academy of Sciences, 79(8):2554-2558 (1982); Paul Smolensky, "Information processing in dynamical systems: Foundations of Harmony Theory," In Parallel distributed processing: Explorations in the microstructure of cognition, vol. 1, pages 194-281, MIT Press (1986).

The connection between the network well-formedness function H and grammar derives from H being a linear combination of grammatical constraint functions $f_C$ each of which measures the degree to which a state violates a grammatical requirement: such an H is called a Harmonic Grammar. See Geraldine Legendre, Yoshiro Miyata, and Paul Smolensky, "Harmonic grammar—a formal multi-level connectionist theory of linguistic well-formedness: Theoretical foundations," In Proceedings of the 12th Meeting of the Cognitive Science Society, pages 388-395 (1990). Thus given the constraint $C_1$:='a sentence has a subject', the vector $|\xi\rangle$ embedding the parse tree of is an English sentence violates $C_1$ once, hence $f_{C_1}(|\xi\rangle) = 1$. See Jane Grimshaw and Vieri Samek-Lodovici. Optimal subjects and subject universals. In P. Barbosa, D. Fox, P. Hagstrom, M. McGinnis, and D. Pesetsky, editors, "Is the Best Good Enough? Optimality and Competition in Syntax," pages 193-219, MIT Press, Cambridge, Mass. (1998). The coefficient of $f_{C_1}$ in H, $w_{C_1}$, is a negative quantity so the missing subject lowers Harmony by $|w_{C_1}|$; this is the strength of the constraint $C_1$ in the Harmonic Grammar H. Harmonic Grammars have proved to be valuable in analyzing natural languages. See Joe Pater, "Weighted constraints in generative linguistics," Cognitive Science, 33(6):999-1035 (2009). Especially valuable are the special Harmonic Grammars in which each $W_{C_k}$ exceeds the maximal possible Harmony penalty arising from the linear combination of all the constraints weaker than $C_k$: these are the grammars of Optimality Theory. See, e.g., Alan Prince and Paul Smolensky, "Optimality Theory: Constraint interaction in generative grammar," Technical report, Rutgers University and University of Colorado at Boulder, 1993, 1993/2004, Rutgers Optimality Archive 537, 2002, Revised version published by Blackwell (2004); Alan Prince and Paul Smolensky, "Optimality: From neural networks to universal grammar," Science, 275(5306):1604-1610 (1997). In such a grammar, numerical weighting is no longer required: only the ranking of constraints from strongest to weakest matters for computing which of two structures has higher Harmony. A structure is optimal—grammatical—if no other structure has higher Harmony.

The well-formed—e.g., grammatical—sentences are those with globally-maximal Harmony. In a neural network, these can be computed via simulated annealing, in which the stochastic network state follows a Boltzmann distribution $p_T(x) \propto e^{H(x)/T}$; during computation, $T \to 0$. (Such networks are Boltzmann Machines or Harmony Networks.) See, e.g., David H Ackley, Geoffrey E Hinton, and Terrence J Sejnowski, "A learning algorithm for Boltzmann machines," Cognitive science, 9(1):147-169 (1985); Pyeong Whan Cho, Matthew Goldrick, and Paul Smolensky, "Incremental parsing in a continuous dynamical system: Sentence processing in Gradient Symbolic Computation," Linguistics Vanguard, 3 (2017). Such Boltzmann distributions also describe the states of interest in the quantum analog of the Harmonic Grammar H.

As well as describing natural languages, Harmonic Grammars can also describe formal languages, that is, sets of symbol sequences derived by repeated application of rewrite rules such as $\mathcal{G}_1 := \{S \to aSb, S \to a \cdot b\}$, which generates the formal language $\mathcal{L}_1 := \{a^n \cdot b^n | n = 1, 2, \ldots\}$ (with parse trees $T_1 := \{[_S a [_S a \ldots [_S a \cdot b] b] \ldots ] b]\}$). The Harmonic Grammar $H_{\mathcal{G}_1}$ corresponding to $\mathcal{G}_1$ will be defined precisely below, but briefly, $H_{\mathcal{G}_1}$ assigns negative Harmony to all ungrammatical sequences of as and bs, and assigns maximal Harmony $-H = 0$—to all grammatical parse trees, $T_1$. One set of constraints assigns negative Harmony to the presence of a or b, while another set of constraints assigns positive Harmony to tree configurations that accord with the grammar rewrite rules, e.g., a mother/left-daughter pair in which the mother node is labeled S and the daughter node a. The contributions of the negative-Harmony constraints are cancelled by the contributions of the positive-Harmony constraints only for grammatical trees.

TPRs provide a highly general framework for embedding in vector spaces symbol structures of virtually any type, not just trees. In general, a type of symbol structure is characterized by a set of roles, each of which can be bound to fillers. In the TPR scheme discussed so far, the fillers are symbols and the roles are the tree nodes, that is the positions in the tree. This is an instance of positional roles. There is another mode of deploying TPRs which becomes of interest for quantum computing: this method deploys 'contextual roles'. Rather than characterizing the role of a symbol in a structure by the position it occupies, one can characterize the role of a symbol by its context of –say, $\gamma = 2$—surrounding symbols. For the sequence abcd, rather than identifying b as the symbol in second position, one can now identify it as the symbol preceded by a and followed by c. So the embedding of abcd is no longer $|a\rangle |1\rangle + |b\rangle |2\rangle + |c\rangle |3\rangle + |d\rangle |4\rangle$ but rather $|abc\rangle + |bcd\rangle = |a\rangle |b\rangle |c\rangle + |b\rangle |c\rangle |d\rangle$. For neural networks this contextual-role scheme quickly becomes prohibitive when the number of symbols is large (such as the number of English words).

In the limit, the context size $\gamma$ used to characterize the role of a symbol is large enough to encompass the entire structure. In this limit, for a binary tree, the tree positions are enumerated $-(p_k)_{k=1, 2, \ldots} := (\epsilon, 0, 1, 00, 01, 10, 11, \ldots)$—and then a tree with symbols $(s_k)$ in positions $(p_k)$ is embedded as the vector $|s_1 s_2 s_3 \ldots\rangle = |s_1\rangle |s_2\rangle |s_3\rangle \ldots$. It is such a maximal-contextual-role TPR that is deployed below for quantum computation.

Although the state space required is typically considerably larger for contextual than for positional roles, the contextual role scheme has a significant advantage over the positional scheme: superposition can preserve identity. If one superimposes $|abc\rangle$ and $|xyz\rangle$, in the positional scheme, one loses the identity of the two sequences, since then $|abc\rangle + |xyz\rangle = (|a\rangle + |x\rangle) |1\rangle + (|b\rangle + |y\rangle) |2\rangle + (|c\rangle + |z\rangle)$ $|3\rangle = |ayz\rangle + |xbc\rangle = |xbz\rangle + |ayc\rangle = \ldots$. But in the contextual scheme, $|abc\rangle + |xyz\rangle = |a\rangle |b\rangle |c\rangle + |x\rangle |y\rangle |z\rangle$, which is unambiguous.

IV. Fock Space Representations

Despite the presence of the tensor product structure exploited by positional-role tensor product representations (pTPRs) for language, implementing them directly on quantum computers can be a challenge. This is because the natural representation of a pTPR would be as a quantum state vector. While such a quantum state vector could be expressed using a very small number of quantum bits, the manipulations needed to manipulate these state vectors to maximize Harmony are non-linear. Since quantum computers cannot deterministically apply non-linear transformations on the state, this optimization involves non-deterministic operations that can require prohibitive amounts of post-selection in order to apply.

For this reason, the use of TPRs deploying maximal contextual roles for encoding language structures in a quantum computer is proposed. This will be called a Fock-space representation. The idea behind the Fock space is that one considers each role that could be filled within the representation as a tensor factor within structures built from a decomposition of this space. This is different from pTPR structures wherein linear combinations of tensor products are used to represent symbol structures. Here every possible combination of roles and fillers are described using a tensor product of simpler terms. For example, if there are R roles then the basis for this Fock space can be expressed in Dirac notation as:

$$|v\rangle = |f_1\rangle \ldots |f_R\rangle, \quad (3)$$

where each $f_i$ is the filler (symbol) bound to positional role $r_i$, an ordering of the roles $r_1, \ldots, r_R$ having been imposed. Thus $|abc\rangle = |a\rangle |b\rangle |c\rangle$.

There are many ways that one could define the basis. The following convention is proposed here. Let $|0\rangle$ represent a positional role that does not have a filler, or equivalently let $|0\rangle$ represent a positional role that is filled with the empty symbol "0". Next, let $a_{f_R}^\dagger |0\rangle$ be the vector that stores the filler $f$ in the positional role $r$. This means that any basis vector in the space of fillers on R roles can be written as $$|v\rangle = a_{f_1}^\dagger |0\rangle \otimes \ldots \otimes a_{f_R}^\dagger |0\rangle := a_{f_1,r_1}^\dagger \ldots a_{f_R,r_R}^\dagger |0\rangle \quad (4)$$

Here each $a_{f,r_j}^\dagger$ is a binding operator, which acts in exact analogy to the creation operator in quantum mechanics. Similarly, define each $a_{f,r_j}$ to be the corresponding unbinding operator, which maps a bound role back to an unbound role and is the Hermitian transpose of $a_{f_1,r_1}^\dagger$. The properties of binding and unbinding operators are summarized below.

require non-classical (or quantum) binding operators. This is shown formally in the theorem below.

Theorem 1. Classical Fock space representations are generalizations of pTPRs in the following sense: for any pTPR encoding that uses a finite set of orthonormal role and filler vectors to encode structures in which a unique filler is assigned to each role, there exists an injective map from the space of pTPRs to Fock space representations, but there does not exist a bijective map.

Proof Without loss of generality, let one assume that there does not exist any recursive structure in the pTPR. This can be done because for any component of the form $[A \otimes r_0 + B \otimes r_1] \otimes r_2 \equiv A \otimes r'_0 + B \otimes r'_1$ by expanding the tensor products and redefining the roles. Since there are a finite number of roles and fillers in a TPR, for concreteness let one assume that there exist N possible fillers $\{A_j : j=1, \ldots, N\}$ and M possible roles $\{r_k : k=1, \ldots, M\}$. Similarly, let $s: \{1, \ldots, M\} \to 1, \ldots, N$ be a sequence of fillers that are used to represent a fixed Out-arbitrary pTPR-such as $$v_{pTPR} = \sum_{j=1}^{M} A_{s(j)} \otimes r_j. \quad (5)$$

Now let one construct an equivalent vector within a Fock space representation. For each binding $A_{s(j) \otimes r_j}$ one can associate a classical binding operator $a_{s(j),r_j}^\dagger$ acting on a different tensor factor. That is to say $$v_{pTPR} \to a_{s(M),r_M}^\dagger \ldots a_{s(1),r_1}^\dagger |0\rangle \quad (6)$$

Since $a_{f,r}^\dagger = a_{f',r'}^\dagger |0\rangle$ if and only if $f=f'$ and $r=r'$, which follows from the definition of the binding operator, it follows that two different pTPRs are mapped to the same Fock space representation if and only if they are the same vector. Hence an injection exists between the representations.

A surjection, on the other hand cannot exist. To see this, let one examine the dimension of the pTPR. It has been assumed that the pTPR exists in a vector space of dimension MN, which follows from the unique binding assumption. On the other hand, the vector space for the Fock representation is of dimension $(N+1)^M$ (the base is N+1 rather than N because of the presence of the vacuum symbol 0). Since the dimensions of the spaces are different, it is impossible to construct a surjective map from pTPR to Fock space representations, unless further restrictions are made on the vectors permitted by Fock space representations. This completes the proof that Fock space representations are a generalization of pTPRs.

At first glance the proof of the above theorem may seem to suggest that Fock space representations are less efficient Properties of binding operators

| | |
|---|---|
| Linearity | $a_{f,r}^\dagger (\alpha|\psi\rangle + \beta|\varphi\rangle) = \alpha a_{f,r}^\dagger |\psi\rangle + \beta a_{f,r}^\dagger |\varphi\rangle,$ |
| Distributivity | $\forall\ f,r,|\psi\rangle,|\varphi\rangle$ and $\alpha,\beta \in \mathbb{C}$ |
| Unique Binding (Nilpotence) | $a_{f,r}^\dagger (a_{f',r'}^\dagger + a_{f'',r''}^\dagger) = a_{f,r}^\dagger\, a_{f',r'}^\dagger + a_{f,r}^\dagger\, a_{f'',r''}^\dagger\ \forall\ r,f,r',f',r'',f''$ |
| Zero Expectation | $a_{f,r}^\dagger,\, a_{f,r}^\dagger = 0 = a_{f,r}^\dagger,\, a_{f,r}\ \forall\ f,\, f',\, r$ |
| Number Operator | $\langle 0| a_{f,r}^\dagger |0\rangle = 0 = \langle 0| a_{f,r} |0\rangle\ \forall\ f,r$ |
| | For $n_{f,r} := a_{f,r}^\dagger a_{f,r}, n_{f,r} a_{f,r}^\dagger |0\rangle = a_{f,r}^\dagger |0\rangle$ and $n_{f,r} |0\rangle = 0$ |

Classical binding operators

| | |
|---|---|
| Commutativity | $a_{f,r}^\dagger,\, a_{f',r'}^\dagger = a_{f',r'}^\dagger,\, a_{f,r}^\dagger\ \forall\ r, f, r', f'.$ |

Although Fock space representations need to use classical binding operators, in fact classical binding operators are special because Fock space representations in general than pTPRs. In fact, even though the vector space that the Fock space equivalent of a pTPR lies in is exponentially larger, the memory needed to store the vector representing a given structure is equivalent. Indeed, the existence of an injective mapping shows that a pTPR can be easily expressed in this form, revealing that there cannot be in principle a difference in the memory required between the two.

However, the exponentially larger space that the Fock-space representations lie in make this a much more convenient language to describe distributions over TPRs or uncertainty in the fillers that are assigned to given roles. Just as probability distributions over n bits live in $\mathbb{R}^{2^n}$, having the ability to work in an exponentially larger space makes it convenient for expressing uncertainty in the binding assignments. This property also allows one to represent quantum distributions over bindings, which further makes this representation indispensable when looking at language processing on quantum computers.

V. Harmony Operators

In Gradient Symbolic Computation, a Harmony function is optimized to determine whether a sentence is grammatical. The objective within that framework is to find grammatical sentences by globally optimizing the Harmony, which is a measure of how well-formed a sentence is. By convention, negative Harmony is associated with ungrammatical sentences and zero Harmony with grammatical sentences.

As an example, consider the following grammar, with fillers {S, A, B}, which generates strings of the form $A^n \cdot B^n$ for any integer n, where S is a start symbol and {A, ..., B} are terminal symbols. One can represent this by building a ternary tree that takes the form of a herring bone and assigning roles {$c_0, l_1, c_1, r_1, l_2, c_2, r_2, \ldots$} to the fillers (where l, c, s denote 'left, center, right' daughter nodes). The simplest such tree generated by the grammar takes the form in a pTPR of $S \otimes c_0 + A \otimes l_1 + \cdot \otimes c_1 + B \otimes r_1$. A choice of Harmony function that works for this assigns Harmony −3 to S in role $c_0$, Harmony −4 to S placed in $c_d$; d>1, and a Harmony penalty of −1 for all other symbols. Harmony bonuses of +2 are given if both $S \otimes c_{d-1}$ and any of $A \otimes l_d$, $S \otimes c_d$, $\cdot \otimes c_d$, or $B \otimes r_d$ are bound. The Harmony of such a tree is then 0 and thus it is grammatical. The same rules can easily be generalized to arbitrarily long examples of this grammar.

In Fock space representations, one also has the notion of Harmony but the concept of Harmony needs to be more general in this framework. This stems from the fact that for Fock space representations the natural generalization of Harmony is an operator rather than a function, as seen below.

Definition 1. A Harmony operator $\mathcal{H}$ for a Fock space representation of N dimensions is a Hermitian matrix in $\mathbb{C}^{N \times N}$ and the grammatical sentences then correspond to principal eigenvectors of $\mathcal{H}$.

As a particular example of such a Harmony operator, let us consider the previously discussed $A^n \cdot B^n$ grammar. The Harmony operator for an arbitrary depth sentence can be expressed as $$\mathcal{H} = n_{c_0,S} - \sum_{j=0}^{\infty} \sum_{r \in \{r_j, c_j, l_j\}} (4n_{S,r} + n_{A,r} + n_{B,r} + n_{\cdot,r}) + \quad (7)$$

$$2\sum_{j=0}^{\infty} \sum_{r \in \{r_j, c_j, l_j\}} (4n_{S,c_j} + n_{A,l_j} + n_{\cdot,c_j} + n_{B,r_j}).$$

Note that in this particular context, the Harmony operator can be thought of as a function rather than an operator because the Harmony operator is a sum of number operators which can each be represented as a diagonal matrix. Thus the Harmony operator can be replaced (at a conceptual level) by a function that yields the Harmonies for each possible configuration of the system.

This need not be the case in general. Settings are possible in which non-classical effects appear. Under the most quantum-mechanical interpretation, where the phase of isolated states has no observable consequence, $-|\psi\rangle$ and $|\psi\rangle$ have the same interpretation. Then $|\psi_+\rangle := (|J\rangle + |K\rangle)$ |Subject⟩ +|left⟩ |verb⟩ and $|\psi_-\rangle := (|J\rangle - |K\rangle)$ |Subject⟩ +|left⟩ |verb⟩ also have the same interpretation, an ambiguous blend of the interpretations 'Jay left' and 'Kay left'. However $|\psi\rangle = \frac{1}{2}(|\psi_+\rangle + |\psi_-\rangle)$ is unambiguously 'Jay left'. That the superposition of two ambiguous states can be unambiguous is a purely quantum effect. For this reason, the following dichotomy between Harmony operators is introduced:

Definition 2. A Harmony operator $\mathcal{H}$ is classical if for all number operators $n_{f,r}$ used in the language, $\mathcal{H}$ satisfies $n_{f,r} \mathcal{H} - \mathcal{H} n_{f,r}$.

A natural example of a classical Harmony operator is given in Eq. (7). It is clearly a classical Harmony operator because it only depends on number operators, which do not change the fillers bound to any role. Thus the order in which you (i) count whether a role holds a particular filler and (ii) apply the Harmony operator does not matter, and hence the example is classical.

Figure 2:
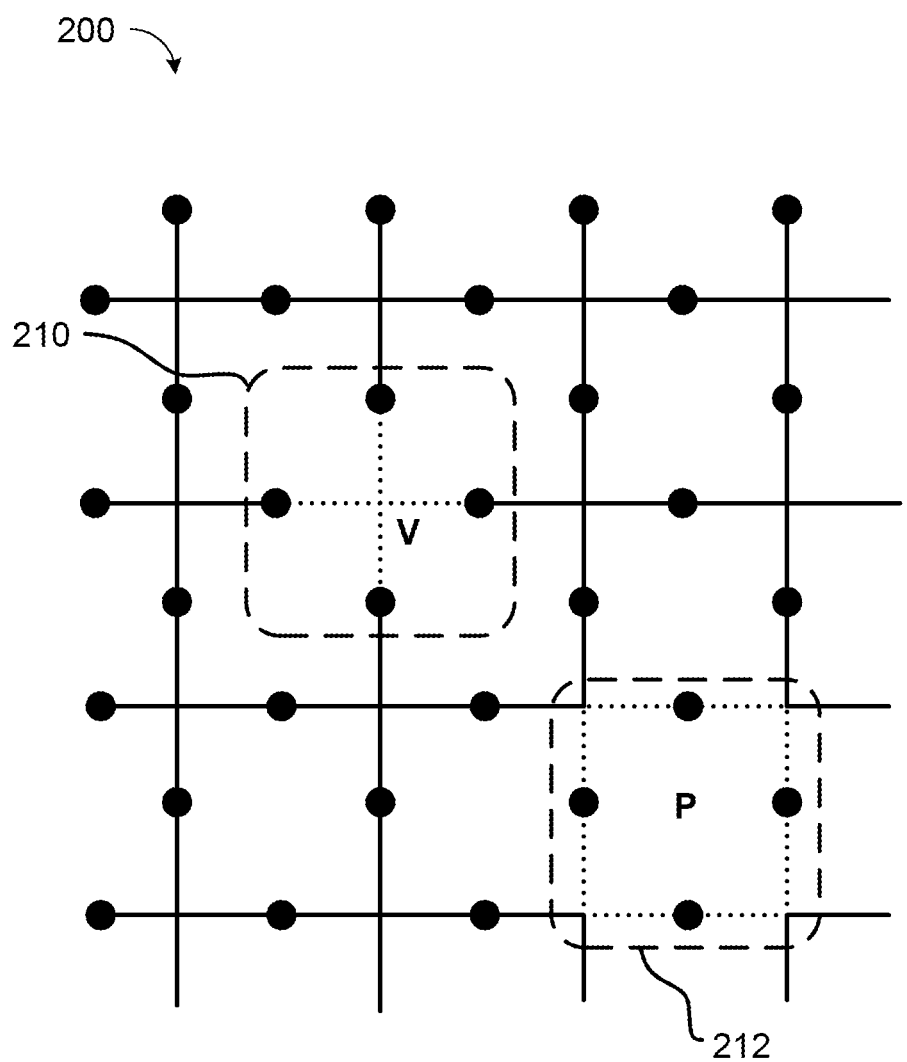
FIG. 2 is a schematic block diagram of a patch of surface code with circles denoting the occupation states for the Fock-space representation.

As an example of a non-classical Harmony operator consider the following. Assume that one is given a square lattice where each vertex in the graph holds a role, as illustrated by FIG. 2. In particular, FIG. 2 is a schematic block diagram 200 of a patch of surface code with circles denoting the occupation states for the Fock-space representation (equivalently qubits in the language of quantum computing). The dotted cross (shown at 210) gives an example of a 'vertex' interaction between four occupation states and the dotted square (shown at 212) is an exemplar of the plaquette interaction between the four occupation states located on the perimeter of the square. The sets V and P mentioned in the text consist of the union of all such vertex and plaquette subgraphs within the surface code.

Let P be the set of plaquettes in the graph (meaning the set consisting of all the unit cells in the graph which each consist of 4 vertices because the graph is square) and let V be the vertex set for the graph (meaning the set of all sets of 4 vertices about each vertex in the square graph). The language in this case is generated by a single filler and the Harmony operator can be expressed as $$\mathcal{H} = - \sum_{\{r_1, r_2, r_3, r_4\} \in P} (1 - 2nr_1) \otimes (1 - 2nr_2) \otimes (1 - 2nr_3) \otimes (1 - 2nr_4) - \quad (8)$$

$$\sum_{\{r_1, r_2, r_3, r_4\} \in V} (a^\dagger_{r_1} + a_{r_1}) \otimes (a^\dagger_{r_2} + a_{r_2}) \otimes (a^\dagger_{r_3} + a_{r_3}) \otimes (a^\dagger_{r_4} + a_{r_4}).$$

This Harmony operator corresponds to the Toric code, which can be used as an error correcting code for quantum computing. The states of maximum Harmony correspond to the minimum energy subspace of the code, which is proven to be protected from local error. This shows that apart from mere academic curiosity, non-classical Harmony operators are vitally important for quantum computing and also that quantum error correction has deep links to linguistics when viewed through this lens.

The expression for the Harmony of a given Fock space representation takes the same form regardless of whether one has a classical or a quantum Harmony operator.

Definition 3. Let $|\phi\rangle \in \mathbb{C}^N$ be a Fock space representation of a sentence and let $\mathcal{H} \in \mathbb{C}^{N \times N}$ be a Harmony operator. One can then define the Harmony of $|\phi\rangle$ to be $H(|\phi\rangle) =\rangle \phi | \mathcal{H} |\phi\rangle$.

Finding a grammatical sentence—one that is maximally Harmonic—then boils down to optimizing the expectation value of the Harmony operator. However, this optimization inherently incurs a cost. One can assess the cost of both quantum and classical Harmony optimization using an oracle query model. Within this model, one can assume that nothing is known about the Hamiltonian, save what can be gleaned from querying the oracle that represents the Harmony function.

VI. Harmony Maximization: Numerical Simulation

From the perspective of gradient symbolic computation, the goal of parsing a sentence within a grammar is to find the assignment of roles and fillers that maximize the Harmony. Here, the problem of optimizing Harmony for classical Fock spaces is examined, which is to say where the Harmony operator is just a sum of number operators. One can see from these examples that optimizing Harmony within a Fock space representation is practical and as such providing quantum speedups to the learning process is significant.

A. The $A^n \cdot B^n$ Grammar

Recall that the parse tree rules for grammatical expressions of the form $A^n \cdot B^n$ are defined over the four-symbol alphabet $\{A, B, S, .\}$. This is a simple example, where the parse tree can be visualized as a "herring bone" structure (HB) that can be recursively described as follows:

0) zero depth HB consists of one node; 1) the root of an HB of depth n has exactly three children: the children number 1 and 3 are leaves and child number 2 is an HB of depth n−1.

When the n is chosen, the corresponding Fock space and the Harmony operator are fully defined, and Harmony being a diagonal operator, it can be reinterpreted as a certain scalar function h on the space of all possible assignments of symbols to the nodes of the HB structure.

Negative harmony −h can be thus treated as a Hamiltonian of the corresponding Potts model, which is a generalization of the Ising model on the HB graph. See, e.g., Giovanni Gallavotti, "Statistical Mechanics: A Short Treatise," Springer (1999); Renfrey B. Potts, "Some generalized order-disorder transformations," Mathematical Proceedings, 48(1):106-109 (1952). The difference between the model at hand and the traditional Ising model is that the Ising model consists of 2-value spins, whereas in the current instance of the Potts model, each node can assume one of four values in $\{A, B, S, .\}$. The maximum Harmony assignment of these values is understood as a ground state of the Hamiltonian −h.

In this setting, one can find such ground state by the use of the simulated annealing strategy that has an excellent track record in solving Ising models. An outline of an algorithm for solving a more general Potts model is as follows:

```
Algorithm 1 Simulated annealing for Potts model.

Require: Coupling graph G, initial symbol assignment A₀ to nodes of G,
    maximum iterations maxUp; hyperparameter:
    cooling schedule t(i), i = 1, . . . , N
Ensure: initial symbol assignment A_opt
 1:  h ← Harmony(A₀); A ← A₀; A_opt ← A
 2:  for i ∈ {1, . . . , N} do
 3:      β ← 1/t(i)
 4:      for c ∈ {1, . . . , maxUP} do
 5:          u ← random symbol update; h' ← Harmony(u(A))
 6:          if (h' ≥ h)||(rand( ) < exp(β(h' − h))) then
 7:              A ← u(A); h ← h'
 8:              if h = 0 then
 9:                  return A {Early breakout on perfect Harmony}
10:             end if
11:         end if
12:     end for
13: end for
```

Figure 3:
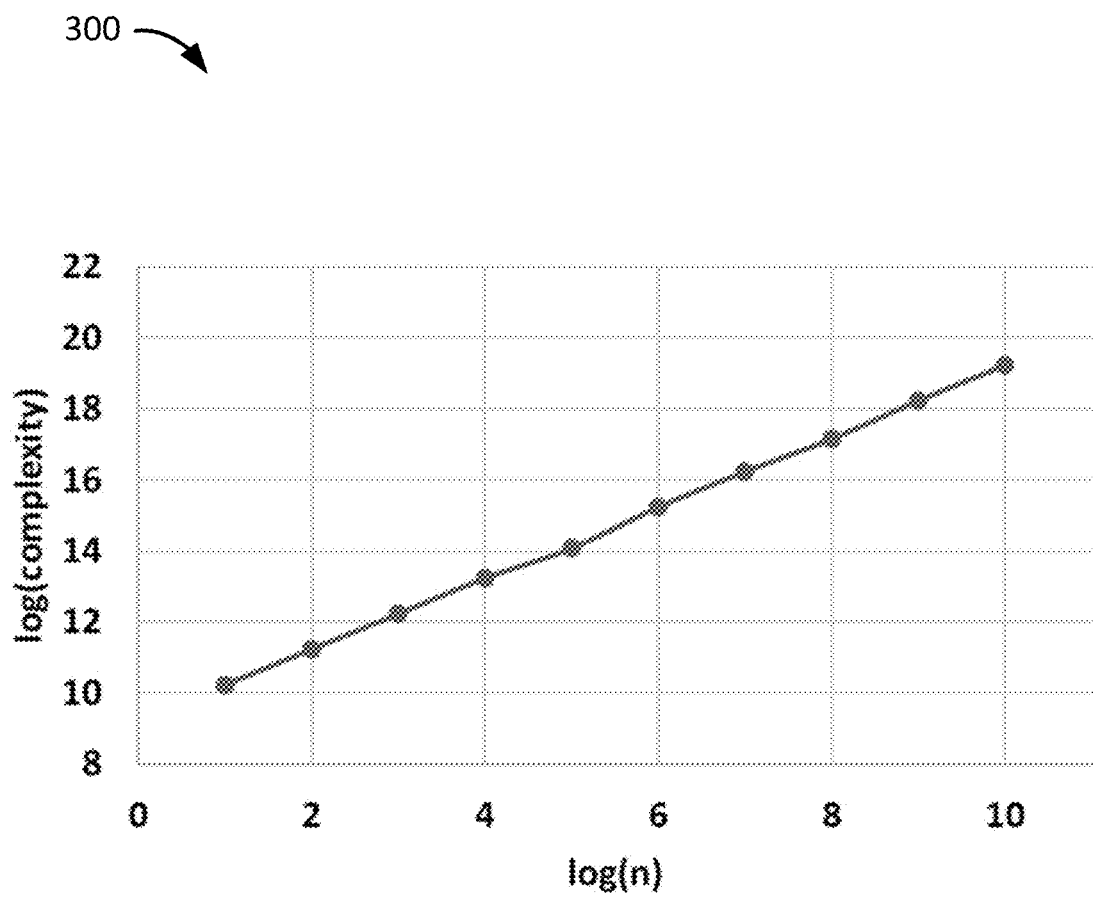
FIG. 3 is a graph showing the annealing complexity as measured by the number of times the Harmony function must be queried to find the tree of maximum Harmony for the $A'':B''$ grammar.

For any pre-selected n there is a unique assignment of symbols that turns the HB structure of depth n into a zero Harmony parse tree. Experiments indicate that this unique grammatical HB structure can be attained by the algorithm 1 that starts from a random symbol assignment in O(n) steps on average. The numeric tests used highly optimized simulated annealing code modified to accommodate Potts models. HB structures were tested with n∈[2 . . . 1024] measuring the minimal number of repetitions and sweeps of the annealing process required for achieving the maximum Harmony. This goal was consistently achievable with 10 repetitions and 20 sweeps independently of n. The minimal number of sweeps would occasionally fall to 19 in about 10% of cases and it was registered at 18 in just one case. Since the structure of depth n has 3 n+1 nodes, one can say that the maximization required roughly 600n reevaluations of the Harmony function on average with at most 10% vanance. The empirical average complexity of harmonizing to the $A^n \cdot B^n$ expression (as a function of n) is shown in FIG. 3. In particular, FIG. 3 is a graph 300 showing the annealing complexity as measured by the number of times the Harmony function must be queried to find the tree of maximum Harmony for the $A^n \cdot B^n$ grammar–(Dual log scale).

TABLE I

Table describing the Harmony operator for the balanced parenthesis grammar.

| Harmony Function | |
|---|---|
| Symbol | Harmony |
| S | −2 |
| A | −3 |
| B | −3 |
| C | −3 |
| ( | −1 |
| ) | −1 |

| Parent | Left Child | Harmony |
|---|---|---|
| S | B | 2 |
| S | C | 2 |
| B | ( | 2 |
| A | S | 2 |
| C | S | 2 |

| Parent | Right Child | Harmony |
|---|---|---|
| B | A | 2 |
| B | ) | 2 |

TABLE I-continued

Table describing the Harmony
operator for the balanced parenthesis grammar.

| A | ) | 2 |
|---|---|---|
| C | S | 2 |

Harmony Operator $$\mathcal{H} = \sum_j (n_{S,j}(-2 + \delta_{j,1}) - 3(n_{A,j} + n_{B,j} + n_{C,j}) - n_{(,j} - n_{),j})) +$$

$$2\sum_j (n_{S,j}n_{B,L(j)} + n_{S,j}n_{C,L(j)} + n_{B,j}n_{(,L(j)} + n_{A,j}n_{S,f(j)} + n_{C,j}n_{S,f(j)}) +$$

$$2\sum_j (n_{B,j}n_{A,R(j)} + n_{B,j}n_{),R(j)} + n_{A,j}n_{),R(j)} + n_{C,j}n_{S,R(j)})$$

A Harmony bonus of +1 is assigned for having S at the root of the tree.
Unless othewise stated, the Harmony for a given configuration is zero.
Also given is the classical Harmony operator for balanced parenthesis grammar on a Fock space consisting of $2^D$ modes where one can define for any vertex j L(j) to be the left child of the node and R(j) to be the right child.

B. The Balanced Parentheses Grammar

The balanced parentheses grammar to enumerate and error correct grammatical expressions composed of left and right parentheses is a grammar over the alphabet of 6 symbols A, B, C, S, (,) and the following set of normalized generative rules:

$$S \rightarrow B, S \rightarrow C, B \rightarrow (A, B \rightarrow (\ ), A \rightarrow S), C \rightarrow SS.$$

Figure 4:
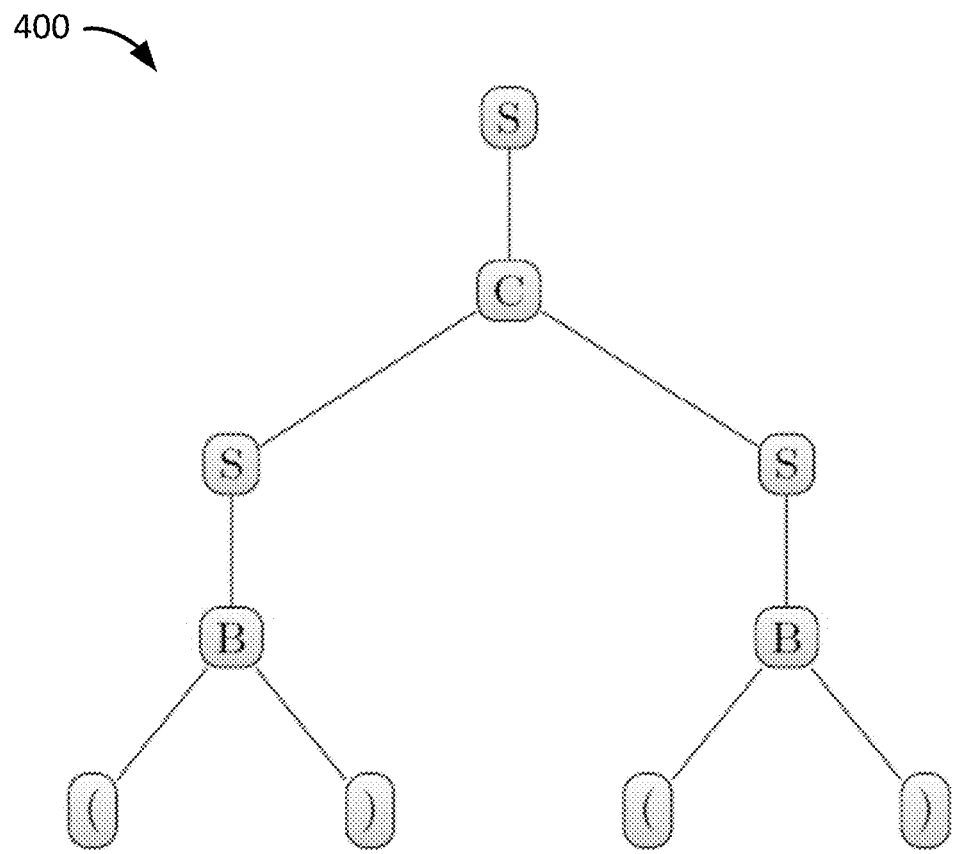
FIG. 4 is a schematic block diagram showing an example of an optimal Harmony parse tree.

Semantically the S symbol can only occur at root of a grammatical parse subtree tree or a complete grammatical parse tree. For example, FIG. 4 is a schematic block diagram 400 showing an example of an optimal Harmony parse tree. In more detail, FIG. 4 shows the unique parse tree for the expression ( ) ( ) that is a concatenation of two disjoint grammatical subexpressions.

The Harmony function for this grammar is the following.

Assuming the structure of a candidate parse tree is known, so is the structure of the corresponding Fock space, so is the Harmony operator. As explained above, in case when the Harmony operator is diagonal, it can be cast as a real-valued function h on the space of all possible node→symbol assignments for the given parse tree. An optimum-Harmony assignment of the symbols can be then found as an argmax of the function h using a suitable maximization method. It is demonstrated below how this can be done with a certain simulated annealing approach. Unfortunately, not every candidate parse tree allows symbol assignment that realizes the absolute maximum of Harmony. In fact, if one considers a set of binary trees of known maximum depth D and known maximum leaf count L, then the subset of binary trees that allows grammatical assignment is exponentially small vs. the entire set (w.r.t. D,L). One can dub a binary tree that allows such maximum Harmony symbol assignment a feasible parse tree. All other trees are dubbed infeasible. It follows that the relatively simple code for maximizing Harmony on a given candidate parse tree should be just a subroutine in a higher level algorithm that enumerates all feasible parse trees, or, for error correction purposes, morphs an infeasible tree into a feasible tree. As shown below, the higher level of the overall algorithm can be also designed along the lines of simulated annealing over a reasonable update heuristics.

1. Recursive Enumeration of Feasible Parse Trees.

Start with a specialized Harmony optimization method that exploits the fact that the parentheses placement grammar is context-free. This method is likely to generalize well to any context-free grammar. Observe that in this context any subtree of an optimal parse tree is optimal. Let one make a stronger observation for the particular Harmony Hamiltonian proposed in Table I.

Lemma 1. For the Harmony operator in Table I: an entire harmonical parse tree has the Harmony of 0; any subtree of such tree has the Harmony of −1.

Proof Before proceeding with a recursive proof, recall that there is a Harmony bonus of +1 for symbol S at the root of the entire tree. Disregarding this bonus, one can say that the entire tree and any of its subtrees must have the Harmony of −1 in a harmonical parse tree. Let one first prove, recursively, that a parse subtree with any assignment of symbols cannot have Harmony greater than −1. Indeed it is obvious for subtrees of depth 0. Assuming it has been proven for subtrees of depth at most d consider a parse subtree of depth d+1. Any child subtree of its roots has the Harmony of at most −1 by the induction hypothesis. The Harmony of the symbol assignment at the root is negative. Unless the edges to the child subtrees correspond to the correct generative rules (and thus incur the Harmony bonus of +2), the overall Harmony is going to be less than −1. So let one exhaust cases where the edges do correspond to generative rules.

Case A,B,C: Root assignment of either A,B,C carries Harmony penalty of −3. If there is only one child subtree with the Harmony −1 the total subtree Harmony cannot exceed −1+2−3=−2. If there are two child subtrees, the Harmony cannot exceed −1+(−1)+2+2−3=−1. Case S: If there are two child subtrees under the root, each with Harmony −1, one notes that at most one edge to one of those subtrees can gain the Harmony bonus of +2 (since S has no generative rules with two children). Thus the overall Harmony cannot exceed −1+(−1)+2+0−2=−2. If there is only one subtree under the root, the overall Harmony still cannot exceed −1+2−2=−1. Case (,): the case when the root assignment is one of the parentheses is obvious. Let one now prove, by case distinction, that in a parse subtree of Harmony −1, then any child subtree of its root must also have Harmony −1. Case (,): If the root assignment is either of the parentheses, any child subtree will contribute at most −1 to the overall Harmony. Thus there must be no child subtrees for the overall tree to have Harmony of −1. The claim of the observation is trivially valid. Case A,B,C: Root assignment of either A,B,C carries Harmony penalty of −3. If there is only one child subtree with the Harmony ≤1 the total subtree Harmony cannot be −1. Therefore there are two child subtrees with the harmonies $h_1 \leq -1$, $h_2 \leq -1$ and the overall Harmony is at most $h = h_1 + h_2 + 4 - 3 = h_1 + h_2 + 1$. One must have $h_1 = h_2 = -1$ for h=−1. Case S: If there are two child subtrees under the root, each with Harmony ≤−1, one notes that at most one edge to one of those subtrees can gain the Harmony bonus of +2 (since S has no generative rules with two children). Thus the overall Harmony cannot be −1. Therefore there is one child subtree with the Harmony $h_c \leq -1$. And the overall Harmony is at most $h_c$. Thus one must have $h_c = -1$.

---

Algorithm 2 Recursive function enumSubtrees(L, D).

Require: L parse tree leaf count, D maximum depth of a parse tree
Ensure: Complete list of Harmony −1 parse trees of leaf count L and maximum depth D
   1: if D = 0 then
   2:   if L = 1 then
   3:     return [root[(]; root[)]]

-continued

Algorithm 2 Recursive function enumSubtrees(L, D).

```
 4:    else
 5:       return[ ]
 6:    end if
 7: end if{First, all the trees of depth D are enumerated with
    only one child subtree under the root}
 8: ret1 ← [ ]; list1 enumSubtrees(L, D − 1)
 9: for t ∈ list1 do
10:    cand ← root[S], child[t]
11:    if Harmony(cand) = −1 then
12:       retl ← ret1 + [cand]
13:    end if
14: end for{for two-child root, all possible splits of leaf counts
    between children are explored}
15: ret2 ← [ ]
16: for ℓ ∈ {1, . . . , L − 1} do
17:    lleft ← enumSubtrees(ℓ, D − 1)
18:    lright ← enumSubtrees(L − ℓ, D − 1)
19:    for t₁ ∈ lleft, t₂ ∈ lright do
20:       for s ∈ A, B, C do
21:          cand ← root[s], child[t₁], child[t₂]
22:          if Harmony(cand) = −1 then
23:             ret2 ← ret2 + [cand]
24:          end if
25:       end for
26:    end for
27: end for
28: return ret1 + ret2
```

This algorithm reads as a very expensive doubly recursive routine as it is written. However, in practice, it can be made perfectly manageable by caching all the previously computed enumerations in a global cache. This way any recursively requested enumSubtrees(l,d) retrieves the answer immediately from the cache if it has been ever before computed.

2. Annealing into Feasible Parse Trees.

Algorithm 2, developed in the previous subsection, is built upon specific properties of the grammar in question and might not generalize cleanly to other grammars. Consider a general situation where, given a binary tree which is a candidate parse tree, it is then relatively easy to find a maximum-Harmony assignment of symbols to the nodes of the tree. In particular, it is relatively easy to conclude algorithmically, whether the candidate tree is feasible. As per discussion in the beginning of the section, feasible trees are quite rare and the probability that a randomly generated tree is feasible, is exponentially low. One could benefit from a strategy that, given a random tree, can morph the tree after an acceptable number of steps into a feasible tree. Such strategy would have an important error correction aspect, as it would be capable of editing an erroneous parse tree into a correct one at a relatively low cost. A tree morphing strategy needs to be broken up into a sequence of relatively simple steps to be universal and it is intuitively clear that in general the morphing strategy cannot be greedy, e.g. it is in general not possible to reach a feasible tree by a sequence of steps that monotonously increases maximum Harmony of the consecutive candidate trees. Thus, one is again considering the simulated annealing philosophy at this level. Below, one possible design for a tree-morphing algorithm is proposed.

Elementary steps. Allow the following elementary operations on binary trees:

1) Leaf deletion: a leaf of the tree is deleted along with the edge leading to it 2) Leaf creation: a leaf is added to some node with fewer than 2 children.

Clearly this set of operations is universal. Indeed, any tree can be evolved from a root by a sequence of operations of type 2) and any tree can be reduced to a root by a sequence of operations of type 1). Therefore any tree $T_1$ can be morphed into any other tree $T_2$ by a sequence of operations of type 1) and 2). However, it has been found that it is beneficial in practice to introduce a redundant elementary operation:

3) Leaf forking: turn some leaf into an interior node by attaching two new leaves to it.

Morphing under constraints. Just as in the previous subsection, one can drive a request for a feasible tree by stipulating its desired leaf count L and maximum depth D. One can choose the morphing updates such that the depth of the tree post-update never exceeds D and its leaf count stays very close to L. Thus, one can always prefer a leaf forking or leaf creation at interior node, whenever the leaf count falls below L; and one never adds a leaf to an existing leaf node or fork a leaf if this leads to a tree of depth greater than D. (There is a theoretical possibility of a deadlock in this strategy, where a leaf cannot be added without increasing the depth of the tree beyond the limit, however, this cannot happen when $D > \log_2(L)$, which is the primary scenario.) The top-level scheme of an annealing-style tree morphing algorithm is as follows:

Algorithm 1 Recursive function enumSubtrees(L,D).

```
Require: Initial tree T₀, maximum depth D,
  maximum iterations maxUp;
  hyperparameter: cooling schedule t(i), i=1, . . . ,N
Ensure: Feasible parse tree of leaf count L or L−1
 1:    h ← Harmony(T₀); T ← T₀
 2:    if T is feasible then
 3:       return T
 4:    end if
 5:    for i ∈ 1, . . . , N do
 6:       β ← 1/t(i)
 7:       for c ∈ {1, . . . , maxUp} do
 8:          if leafcount(T) < L then
 9:             u ← random additive update for T
10:          else
11:             u ← random reductive update for T
12:          end if
13:          if depth(u(T)) ≤ D then
14:             h' ← maximum Harmony on u(T)
15:             if (h' ≥ h) || (rand() < exp(β(h' − h)) then
16:                h ← h', T ← u(T)
17:             if T is feasible then
18:                return T
19:             end if
20:          end if
21:       end if
22:    end for
23: end for
```

Here the "random additive update" means forking of a randomly selected leaf or adding a leaf as a second child to an interior node. The "random reductive update" as per the given definition of elementary operations means deleting a leaf. In order to spur the convergence and eliminate deadlocks, one can exclude adding leaf(s) to a site where a leaf has been recently deleted and one can exclude deletion of a recently added leaf. The "T is feasible" predicate entails maximizing Harmony over all the assignments of symbols to the nodes of the subtree T. This can be easily done in practice by running a suitable simulated annealing subroutine on the set of all possible symbol assignment configurations. The subtree T is feasible if the maximum Harmony thus achieved is equal to −1.

3. Simulation Metrics for Annealing into Feasible Parse Trees.

After requesting a random binary tree of depth at most 4 with 4 leaves, the initial random tree gets morphed into a feasible 4-terminal parse tree in less than 60 elementary moves of the Algorithm 3. For comparison, it typically takes more than 1000 randomly generated 4-leaf sample trees to get a feasible parse tree candidate. After requesting a random binary tree of depth at most 6 with 5 leaves in takes about 450 elementary moves in median case to generate a feasible parse tree candidate with the harmony of −1. (Obviously, there are no harmonic trees with an odd number of leaves). After requesting a random binary tree of depth at most 7 with 6 leaves in takes about 2100 elementary moves in median case to get a feasible parse tree. (A quick reference to these numbers is given in the Table II.)

TABLE II

Cost of simulated annealing into feasible parse trees

| Depth | Leaves | Number of moves (median) |
|---|---|---|
| 4 | 4 | 55 |
| 6 | 5 | 450 |
| 7 | 6 | 2100 |

The algorithm, however, has some potential downsides. First of all it is sensitive to the shape of initial tree candidate. In case of unfavorable initialization, it could take up to twice as long to terminate than on the average case. A single instance of a 6-leaf run has been registered where it never converged. (This is why the median steps to termination are listed rather than "average"). Another feature of the termination metric is that it is likely to still be exponential in the requested number of leaves.

VII. Computational Power of Quantum Language Processing

It has been shown that Classical Fock Space representations can be used to solve problems in language processing, but an important question remains: "what quantum advantages can be gleaned from using a quantum Harmony operator?" Here, evidence for two kinds of advantages are provided. The first such advantage shows that quantum language processing using a reasonable family of quantum binding operators, cannot be efficiently simulated on a classical computer within arbitrarily small error unless BQP=BPP. This is demonstrated by recasting the problem of parsing a quantum language to the problem of performing a quantum computation. The second such advantage is speed-ups for optimizing classical Harmony functions using quantum simulated annealing.

The issue of the computational harness of quantum learning task has increasingly come to the fore with a number of high-profile dequantizations, or quantum inspired classical algorithms, of quantum algorithms that would seem at first glance to offer exponential speedups. This points a spear at the heart of the hope that quantum models for data may be more expressive than classical methods. Here, this is addressed by showing that there are at least some classes of languages such that evaluating the language is equivalent to quantum computation, thus suggesting that the example approach is unlikely to ever be dequantized. Furthermore, these results trivially show that there exists a class of Boltzmann machines that are universal and cannot be dequantized.

In order to demonstrate that quantum Fock-space representations for language are more powerful than classical representations, one needs to first define a computational model that uses such representations to solve problems. This is done below.

Definition 4. A Harmonic quantum computer can be defined to be a model for quantum computing that obeys the following assumptions.

1. Let $\mathcal{F}$ be a twice-differentiable map from [0, 1] to a Harmony operator acting on O(n) modes such that $\|\mathcal{F}(s)\|$ and $\|\partial_s \mathcal{F}(s)\|$ are in O(poly(n)) for all $s \in [0, 1]$.

2. Let $\mathcal{H}(s)$ consist of a sum of terms that are formed from products of at most $\kappa \in O(1)$ binding operators and that the coefficient of each such term be efficiently computable.

3. Each binding operator in the Fock space representation can be represented as an O(poly(n)) sparse row-computable matrix.

4. The state of the quantum computer can be set at any time, at cost O(poly(n)), to $\Pi_{j=1}^{O(poly(n))} a_j^\dagger |0\rangle$.

5. Assume that the user can measure the occupation number for each role/filler combination in the language at unit cost and also measure in the eigenbasis of $\mathcal{F}(s)$ for any $s \in [0,1]$ within error c and probability of failure at most ⅓ at cost O(poly(n/ϵ)).

With this definition in place, it is easy to see that such a Harmonic quantum computer differs slightly from the type of problems that have been considered previously. No notion of Harmony optimization is built into the computer. Additionally, the computer requires a parameterized family of Harmony operators rather than just one. The requirement that one uses a family of Harmony operators is introduced to deal with the fact that Harmony maximization is absent in this model. Specifically, the problem of Harmony maximization can be solved by choosing a Harmony operator that is easy to solve classically and then slowly transform it to the actual Harmony operator that one wants to solve. This is analogous to adiabatic quantum computing. See Edward Farhi, Jeffrey Goldstone, Sam Gutmann, and Michael Sipser, "Quantum computation by adiabatic evolution," arXiv preprint quant-ph/0001106 (2000).

Theorem 2. There exists a Harmonic quantum computer that satisfies Definition 4 with $\kappa=4$ that is polynomially equivalent to the circuit model of quantum computing.

Proof. In order to prove the claim, one needs to show first that there exists a harmonic quantum computer that can simulate any circuit then it will be shown that this model can be simulated efficiently by a circuit-based quantum computer. The forward direction of the claim follows immediately from David Gosset, Barbara M Terhal, and Anna Vershynina, "Universal adiabatic quantum computation via the space-time circuit-to-hamiltonian construction," Physical review letters, 114(14):140501 (2015) (hereinafter "Gosset"), which shows equivalence between the circuit model of quantum computation and adiabatic quantum computing using an XXZ model on a lattice.

Figure 5:
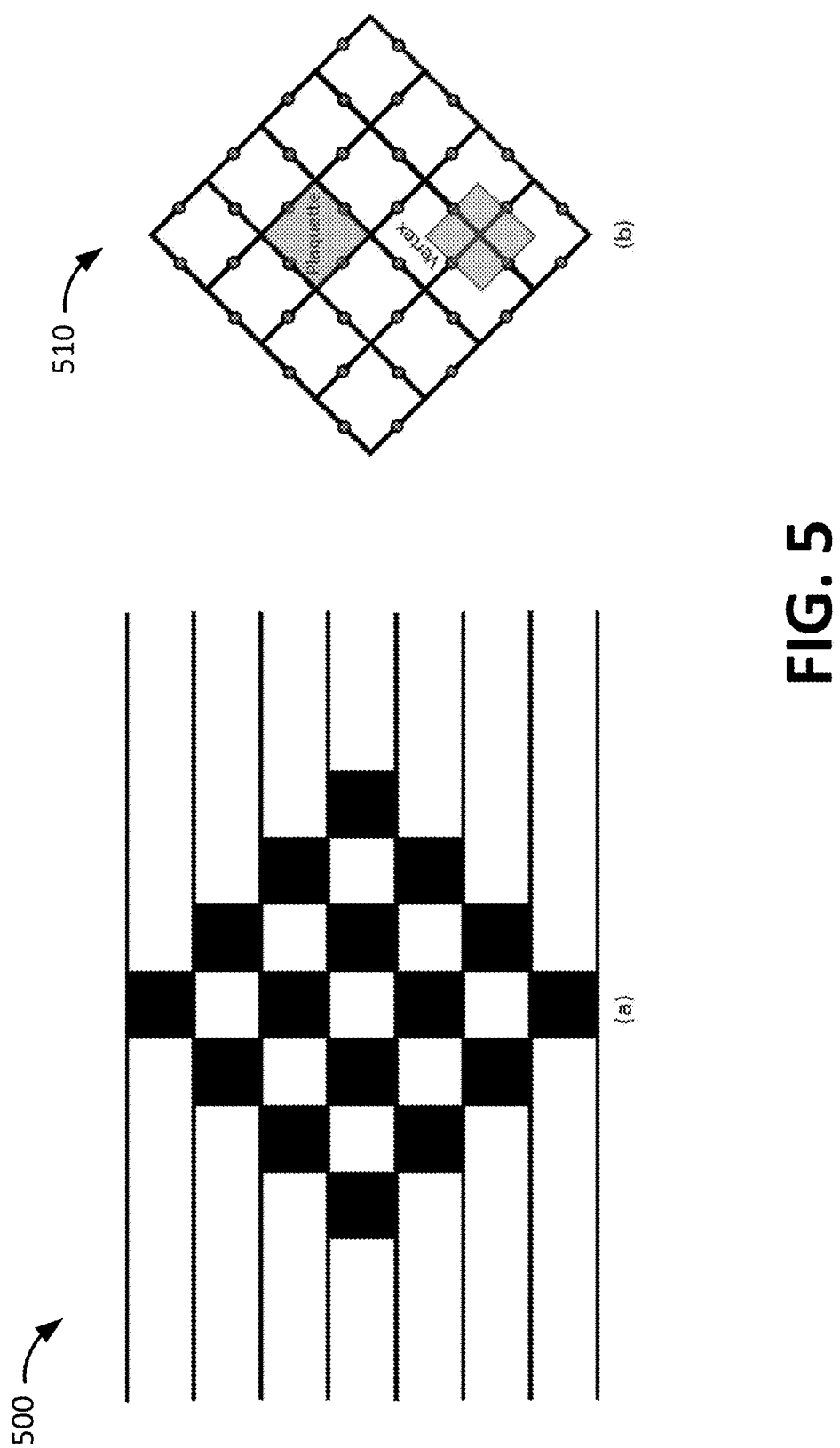
FIG. 5 shows schematic block diagrams illustrating a circuit Hamiltonian constructed used in Gosset.

FIG. 5 shows schematic block diagrams 500 and 510 illustrating a circuit Hamiltonian constructed used in Gosset. Diagram 500 shows in black boxes a set of two-qubit gates acting on a system of 8 qubits. Diagram 510 represents the structure of the Hamiltonian, wherein each circle drawn on an edge represents a site that a particle can be at with examples of the four-body vertex and plaquette operators used in the construction superimposed.

The construction used in this section is the following.

Consider a set of two-qubit gates $\{U_p\}$ that act on 2k qubits with linear-nearest neighbor connectivity. While the two-qubit gates are arbitrary, there is an assumed pattern to their targets. The gates are laid out in a causal diamond. In the first timestep, gate operations only occur between qubits k−1 and k. Similarly, in the last timestep, there is also only a two-qubit gate between qubits k−1 and k. In the second timestep there are two qubit gates between qubits k−1 and k−2 as well as qubits k and k+1. The same qubits are also targeted by the two-qubit gates in the second-last timestep. This process is repeated until both patterns intersect at the $k^{th}$ time step. These two-qubit gates are arbitrary and since they are universal, any quantum circuit can be embedded within this pattern for a sufficiently large k, potentially by taking many of the gates to be identity.

A Harmony operator can be constructed that corresponds to these gates. The Fock space for this Harmony operator consists of roles corresponding to the space-time coordinates that a gate acts within. For example, let w be a qubit that a particular two-level gate acts on and assume that the gate is active between times t and t+1. The roles correspond to the boundaries of this space-time region: (w, t), (w+1, t); (w, t+1); (w+1, t+1). The fillers that are placed in each role are 0, 1 which correspond to the values that the qubits that each of the gates act on could take. One can denote the binding operators for the corresponding grammar to be $a_{(w,t),f}^\dagger$; for $f \in 0,1$ and similarly define $n_{(w,t),f} := a_{(w,t),f}^\dagger a_{(w,t),f}$.

If one defines P to be the plaquettes formed by the boundaries of the space-time volumes that each of the gates resides within (e.g., the t and w coordinates that bound the space and time that each gate acts within) and let V be the vertex set for the graph then one can then define an indexed family of Harmony operators $\mathcal{F}(s)$ for $s \in [0,1]$ to be:

$$\mathcal{F}(s) = \sum_{p \in P} \mathcal{H}^p_{gate}(s) + \sqrt{1-s^2} \, \mathcal{H}_{init} + \sum_{v \in V} \mathcal{H}^v_{string} + \mathcal{H}_{input} \quad (9)$$

Here, it is assumed for convenience that $n_{(w,t)} := (n_{(w,t),0} + n_{(w,f),1})$ and h.c. is used as an abbreviation for Hermitian conjugate $$\mathcal{H}^p_{gate}(s) := -[n_{(\omega,t)} n_{(\omega+1,t)} + n_{(\omega,t+1)} n_{(\omega+1,t+1)} + s \mathcal{H}^p_{prop}], \quad (10)$$

$$\mathcal{H}_{prop} := \sum_{\alpha,\beta,\gamma,\delta} (\langle \beta\delta | U_p | \alpha\gamma \rangle a^\dagger_{(\omega,t+1),\beta} a_{(\omega,t),\alpha} a^\dagger_{(\omega+1,t),\delta} a_{(w+1,t+1),\gamma}) + h.c.$$

$$\mathcal{H}^v_{string}(s) := -[n_{(\omega,t)} + n_{(\omega,t+1)} + n_{(\omega+1,t)} +$$
$$n_{(\omega+1,t+1)} - 2(n_{(\omega,t)} + n_{(\omega,t+1)})(n_{(\omega+1,t)} + n_{(\omega+1,t+1)})],$$

where $\mathcal{H}^v_{string}$ is defined as above for all vertices in the graph that have degree 4, which is to say that the vertices do not sit at the boundary of the causal diamond. If the vertex sits at the boundary the terms that couple outside the diamond are set to zero. It is also implicitly assumed that the w's indexed in the above terms are the spatial coordinates for the qubits within each plaquette that a given gate $U_P$ acts upon. Finally, $$\mathcal{H}_{init} := -[n_{(1,n+1)} + n_{(2n,n+1)}], \quad (11)$$

$$\mathcal{H}_{input} := -\left[\sum_{\omega=1}^{2n} \sum_{t \le n} n_{(\omega,t),1}\right],$$

which serves to create a Harmony penalty if the fillers corresponding to the initial qubit state is not set to 0 at the beginning of the computation (corresponding to s=0). The above Harmony operator satisfies the requirements laid out in Definition 4 with K=4 by inspection.

It is further proved in Gosset, that the maximum eigenvalue of the Harmony operator $\mathcal{F}(s)$ is 0 and the eigenvalue gap for any s is at least $$\gamma(s) \ge \frac{1}{4n+3}\left(1 - s \, \cos\left(\frac{\pi}{2n}\right)\right) \in \Omega(n^{-3}). \quad (12)$$

The state of maximum Harmony is shown in Gosset that if $k=\sqrt{n}/16$ then the configuration with maximum Harmony corresponds can be measured to find the output of the circuit with probability bounded below by a positive constant. Thus $\mathcal{F}(1)$ is a Harmony operator with $\kappa=4$ whose maximum Harmony configuration yields, after a successful measurement, the result of any quantum computation.

In order to see that the cost is O(poly(n)) for the Harmonic quantum computer note that one has within the model ascribed the cost of measuring the Harmony of the system of the system within error and probability at least ⅓ at cost O(poly(n/$\epsilon$)). In order to guarantee that the measurement successfully projects onto the maximum Harmony state, the measurement must have $\epsilon \in O(\gamma)$. Since $\gamma \in \Omega(n^{-3})$ it suffices to choose $\epsilon \in \Theta(n^{-3})$ and thus the cost of the projection within the model is O(poly(n)). Thus if the measurement successfully projects onto the state of maximum Harmony then the computation can be implemented in polynomial time.

Next, it is desirable to show that the measurement at the end of the protocol can be prepared with high probability. The method proposed in Gosset is to use adiabatic state preparation, which is guaranteed to work in polynomial time because the minimum gap is inverse-polynomial. In the current context, one does not have the ability to perform an adiabatic sweep within the model so one can instead use the Zeno-effect to emulate it.

First, the state of maximum Harmony for $\mathcal{F}(0)$ is chosen by design to be a state of the form $\Pi_{j=0}^{2n} a_{(j,0),0}^\dagger |0\rangle$. By assumption, this state can be prepared at no cost in the above model for a Harmonic quantum computer. Now for any $s \in [0,1]$, one has that the state of maximum Harmony $|\psi_{max}(s)\rangle$ can be chosen (by selecting an appropriate global phase as a function of s) to obey for an orthonormal set of instantaneous eigenvectors $\{|\psi(s)\rangle\}$ of $\mathcal{F}(s)$ $$\frac{\partial}{\partial \Delta}|\psi_{max}(s+\Delta)\rangle\Big|_{\Delta=0} = \sum_{\psi(s) \ne \psi_{max}(s)} \frac{\langle \psi(s)|\dot{\mathcal{F}}(s)|\psi_{max}(s)\rangle}{\langle \psi_{max}(s)|\mathcal{F}(s)|\psi_{max}(s)\rangle - \langle \psi(s)|\mathcal{F}(s)|\psi(s)\rangle}|\psi(s)\rangle, \quad (13)$$

$$:= \sum_{\psi(s) \ne \psi_{max}(s)} \frac{\langle \psi(s)|\dot{\mathcal{F}}(s)|\psi_{max}(s)\rangle}{\gamma_{\psi,\psi_{max}}}|\psi(s)\rangle.$$

which exists because the spectral gap is in $\Omega(n^{-3})$ from (12). It then follows from Taylor's theorem that if one takes $P^\perp(s) = (\mathbb{1} - |\psi_{max}(s)\rangle \langle \psi_{max}(s)|)$ then it is immediately clear from the fact that $P^\perp(s)|\psi_{max}(s)\rangle = 0$ that $$\frac{\partial}{\partial \Delta} \langle \psi_{max}(s+\Delta)|P^{\perp}(s)|\psi_{max}(s+\Delta)\rangle \Big|_{\Delta=0} = \quad (14)$$
$$\langle \dot{\psi}_{max}(s)|P^{\perp}(s)|\psi_{max}(s)\rangle + \langle \psi_{max}(s)|P^{\perp}(s)|\dot{\psi}_{max}(s)\rangle = 0.$$

Similarly, it is easy to see that $$\frac{\partial^2}{\partial \Delta^2} \langle \psi_{max}(s+\Delta)|P^{\perp}(s)|\psi_{max}(s+\Delta)\rangle \Big|_{\Delta=0} = 2\langle \dot{\psi}_{max}(s)|P^{\perp}(s)|\dot{\psi}_{max}(s)\rangle \quad (15)$$

Thus, one has that if the spectral gap is at least $\gamma(s)$ for all s then $$\left| \frac{\partial^2}{\partial \Delta^2} \langle \psi_{max}(s+\Delta)|P^{\perp}(s)|\psi_{max}(s+\Delta)\rangle \Big|_{\Delta=0} \right| = \quad (16)$$

$$2 \left| \sum_{\psi(s),\psi'(s)\neq \psi_{max}(s)} \frac{\langle \psi(s)|\dot{\mathcal{F}}(s)|\psi_{max}(s)\rangle \langle \psi_{max}(s)|\dot{\mathcal{F}}(s)|\psi'(s)\rangle}{\gamma_{\psi,\psi_{max}} \gamma_{\psi',\psi_{max}}} \delta_{\psi,\psi'} \right| =$$

$$2 \left| \sum_{\psi(s)\neq \psi_{max}(s)} \frac{\langle \psi(s)|\dot{\mathcal{F}}(s)P^{\perp}(s)|\psi(s)\rangle \langle \psi(s)|P^{\perp}(s)\dot{\mathcal{F}}(s)|\psi_{max}(s)\rangle}{\gamma_{\psi,\psi_{max}}^2} \right| \le$$

$$2 \frac{1}{\gamma(s)^2} \left| \sum_{\psi(s)} \langle \psi_{max}(s)|\dot{\mathcal{F}}(s)P^{\perp}(s)|\psi(s)\rangle \langle \psi(s)|P^{\perp}(s)\dot{\mathcal{F}}(s)|\psi_{max}(s)\rangle \right| =$$

$$\frac{2}{\gamma(s)^2} |\langle \psi_{max}(s)|\dot{\mathcal{F}}(s)P^{\perp}(s)\dot{\mathcal{F}}(s)|\psi_{max}(s)\rangle| \le \frac{2\|\dot{\mathcal{F}}(s)\|^2}{\gamma(s)^2}.$$

For any $\Delta>0$, one therefore has from (14), (16) and the fundamental theorem of calculus that $$\langle \psi_{max}(s+\Delta)|P^{\perp}(s)|\psi_{max}(s+\Delta)\rangle = \quad (17)$$

$$\int_0^{\Delta} \int_0^{\tau} \frac{\partial^2}{\partial \delta^2} \langle \psi_{max}(s+\delta)|P^{\perp}(s)|\psi_{max}(s+\delta)\rangle d\delta dt \le \max_s \frac{\Delta^2 \|\dot{\mathcal{F}}(s)\|^2}{\gamma(s)^2}$$

Now, assume that one attempts to prepare the state $|\psi_{max}(1)\rangle$ by uniformly sweeping over s and taking $\Delta=1/r$ for r steps. This gives from the union bound $$P_{fail} \le r \max_s \left( \frac{\|\dot{F}\|^2}{r\gamma(s)} \right)^2 = \frac{1}{r} \max_s \left( \frac{\|\dot{F}\|^2}{\gamma(s)} \right)^2. \quad (18)$$

Equation (10) gives that $\|\dot{\mathcal{F}}(s)\|$ is in $O(\text{poly}(n))$ and $\gamma(s)$ also is known to be in $\Omega(\text{poly}(n))$. Therefore, one has $r \in \Theta(\text{poly}(n))$ measurements in the eigenbasis of $\mathcal{F}(s)$ suffices to prepare the state. Each such measurement must now, however, have a probability of failure of at most $1/r$, which necessitates a logarithmic number of repetitions given that by assumption the probability of success for measurement in the Harmonic quantum computer model is at least ⅔. Thus, the total cost of preparing the state is polynomial and in turn all quantum circuits can be simulated within the model of computing.

Next, it is desirable to show the converse, specifically that circuit based quantum computers can simulate a Harmonic quantum computer within bounded error using a polynomial number of gate operations. First, if the number of terms present in the Harmony operator is polynomial and each binding operator is itself representable as a row-computable $O(\text{poly}(n))$-sparse matrix then it follows that for all s, $\mathcal{F}(s)$ can be represented as a row-computable $O(\text{poly}(n))$-sparse matrix as well.

If $\mathcal{F}(s)$ is a row-computable $O(\text{poly})(n)$-sparse matrix then it follows that, for any s, $e^{-i\mathcal{F}(s)}$ can be simulated within error c using $O(\text{poly}(n/\epsilon))$ gates. Thus, by using phase estimation, one can simulate a measurement in the eigenbasis within error c and probability of success greater than ⅔ using $O(1/\epsilon)$ applications of this simulation. Thus the measurement can be implemented within cost $O(\text{poly}(n/\epsilon))$ as required.

Next, it is desirable to be able to apply the binding operators to prepare the initial state. This is potentially challenging as the binding operators need not be unitary. This can be solved by noting that $$e^{-i\pi(a^{\dagger}+a)/2}|0\rangle = -ia^{\dagger}|0\rangle \quad (19)$$

Thus one can prepare the state if one applies the creation operator within error $\epsilon$ at cost $O(\text{poly}(n/\epsilon))$. Since $a^{\dagger}$ can be represented as an $O(\text{poly}(n))$-sparse row computable matrix this is possible. Further, since the number of times this process must be repeated is $O(\text{poly}(n))$ it follows that one can also, by decreasing the error tolerance in each individual state prep, prepare the initial state within constant error using $O(\text{poly}(n))$ gate operations. From this it follows that each step in a protocol involving a Harmonic quantum computer that satisfies these assumptions can be efficiently simulated on a quantum computer. This proves the converse direction for the proof.

A natural consequence of this theorem is that there also exist models of quantum Boltzmann machines on lattices that are polynomially equivalent to quantum computing. Previous work has shown that in principle such Boltzmann machines are BQP-hard to train and evaluate but did not show that they are BQP complete. This disclosure provides such a proof.

A. Quantum Advantages for Classical Harmony Optimization

If a Harmony operator is classical then in general it is reasonable to believe that a machine that implements Harmony optimization has no more power than a non-deterministic Turing machine. While this is certainly true, polynomial improvements to the annealing methods discussed above can be achieved using quantum computers or potentially classes of quantum annealers. In this disclosure, the attention is focused on the case of quantum computers as the case for potential advantage is more clear in that setting. Here, a discussion is provided of the previous work of RD Somma, S Boixo, Howard Barnum, and E Knill, "Quantum simulations of classical annealing processes," Physical review letters, 101(13):130504 (2008), which shows that polynomial advantages can be attained for classical annealing processes and argue that these speedups indeed will be polynomial for optimization problems such as those that were examined above.

The cost of simulated annealing depends strongly on the spectral gap of the associated Markov process. If one considers a sequence of inverse temperatures, $\beta_k$ then let $\delta$ be the minimum spectral gap of the transition matrices corresponding to the temperatures $\beta_k$. Also let $\gamma$ be the minimum gap between the maximum Harmony state and the state with next highest Harmony and let $\epsilon$ be a tolerable failure probability and let the process take place in a space with D configurations. Provided that the final value of β obeys $\beta_f \in O(\gamma^{-1} \log(D/\epsilon^2))$ then the complexity of simulated annealing scales as $$N_{SA} \in O\left(\frac{\|\mathcal{H}\| \log(D/\epsilon^2)}{\gamma^\delta}\right). \quad (20)$$

In practice, since $\|\mathcal{H}\|$ typically scales polynomially with the number of roles and the gap is on the order of 1 the dominant contribution to the cost is from the gap of the Markov chain, δ.

Quantum algorithms can be used to improve upon this. The most natural way to do so is to replace the random process of choosing new configurations with a quantum walk on a bipartite graph with each subgraph corresponding to a different configuration for the system. The purpose of the quantum walk is to accelerate the mixing time. However, along the way the annealing process wherein β is decreased requires projecting the quantum walk into an eigenstate of the walk operator at each step. This process can be implemented using phase estimation and adds to the cost of the protocol. The final complexity of the algorithm when accommodating for these issues is $$N_{QSA} \in O\left(\frac{\|\mathcal{H}\|^2 \log^3(D/\epsilon^2)}{\gamma^2 \sqrt{\delta}}\right), \quad (21)$$

which has quadratically better scaling with the gap of the Markov chain and at the price of worse scaling with the remaining parameters. Given the fact that for the applications disclosed herein these parameters are expected to be exponentially smaller than the gap of the Markov chain, the improvements that quantum offers can be significant.

VIII. Learning the Harmony Operator

The problem of Harmony optimization is in general a challenging problem. It involves finding configurations that achieve maximal Harmony over the set of all possible occupations within the Fock space. This problem is unlikely to be solvable either classically or quantumly even for classical Harmony operators. This challenge can be clearly seen because binary satisfiability problems such as 3-SAT can be mapped to a Harmony optimization problem. Thus, if one could efficiently maximize Harmony in general on either type of computer, it would imply that either BPP=NP or BQP=NP, both of which are false under broadly accepted complexity-theoretic conjectures. These complexity-theoretic results imply that one cannot expect greedy local optimizers to yield states of globally maximum Harmony.

The shortcomings of local optimizers can be sidestepped by using global optimizers such as simulated annealing, quantum annealing, or iterated local search. Simulated annealing is a physics-inspired algorithm that aims to mimic annealing processes in metallurgy. The idea behind the algorithm in our context is, given a particular Fock state $|\phi\rangle$ randomly alter the occupations using one of a set of predefined moves. This move yields a new state $|\phi'\rangle$ which is accepted if the Harmony is improved but only rejected with probability proportional to $e^{\beta(H(|\phi'\rangle)-H(|\phi\rangle))}$ for some constant β>0 if the Harmony is not improved by the move. This gives annealing the ability to escape from local optima while at the same time retaining many of the features of local optimization. This method is pursued in Section VI.

A. Quantum unsupervised learning of Harmony operators

While classical Harmony functions may have a natural construction for the problem at hand, it is often difficult to find a unique quantum Harmony operator that is ideally suited for a given language processing task. This naturally raises the possibility of inferring, from data from a language, a quantum Harmony operator that can then be used to determine whether a given sentence is grammatical. In the next subsection, an example technique is presented to addressing this problem by learning a quantum Harmony operator by supervised training. That is to say, the user is provided with an oracle that yields copies of quantum state vectors appended with a label that specifies whether the vector is grammatical or not. One can first pre-train a quantum Boltzmann machine to generate a surrogate for the data set using a learning algorithm that will assign weights to maximize Harmony for grammatical examples and minimize Harmony for ungrammatical examples. See, e.g., Nathan Wiebe, Ashish Kapoor, and Krysta M Svore, "Quantum deep learning," Quantum Information and Computation, 16(7-8):541-587 (2016); Mohammad H Amin, Evgeny Andriyash, Jason Rolfe, Bohdan Kulchytskyy, and Roger Melko, "Quantum boltzmann machine," Physical Review X, 8(2):021050 (2018); Maria Kieferova and Nathan Wiebe, "Tomography and generative training with quantum Boltzmann machines," Physical Review A, 96(6):062327 (2017).

This pre-training step can be done simply by applying the work of Maria Kieferova and Nathan Wiebe, "Tomography and generative training with quantum Boltzmann machines," Physical Review A, 96(6):062327 (2017). The idea is to train a Boltzmann machine to generate a data set that is close to the distribution over the training data in terms of a natural statistical distance (or divergence). The most natural figure of merit to use is the quantum relative entropy using either Golden-Thompson or relative entropy training. Below, the result is stated for relative entropy training, but exactly the same result also holds for Golden-Thompson training which is better suited for cases where latent variables are used.

Theorem 3. Let $|v_k\rangle$ : k=1, . . . , K be vectors in $\mathbb{C}^{2^n}$ for positive integers K and n with $$\rho = \frac{1}{K} \sum_{k=1}^{K} |v_k\rangle\langle v_k|$$

and let $\mathcal{H}(\omega) = \sum_{i=1}^{D} \omega_i \mathcal{H}_i : \mathbb{R}^D \to \mathbb{C}^{2^n \times 2^n}$ be a map such that for any $\omega \in \mathbb{R}^D$, $\mathcal{H}(\omega)$ is a quantum Harmony operator. If one assumes that one has an oracle F that, when given $\omega \in \mathbb{R}^D$, yields $\sigma(\omega) = e^{H(\omega)}/\mathrm{Tr}(e^{H(\omega)})$ then the number of queries to F and training examples needed to estimate the gradient of $S(\rho|\sigma(\omega))$ with respect to ω within error ϵ in the Euclidean-norm with probability greater than ⅔ is in $O(D^2/\epsilon^2)$.

Proof. The proof is a direct consequence of Theorem 1 of Maria Kieferova and Nathan Wiebe, "Tomography and generative training with quantum Boltzmann machines," Physical Review A, 96(6):062327 (2017).

This shows that you can learn a Harmony operator by training a quantum Boltzmann machine in an unsupervised manner on a sample of sentences from the target language. Given a Harmony operator $\mathcal{H}$ it is then easy to generate a possible parsing of the state. You simply prepare an input state vector $|v_{test}\rangle$ and apply quantum phase estimation to it using operator $\mathcal{H}$. The aim is then to find, subject to a Harmony threshold κ, an eigenvector $|\sigma\rangle$ of $\mathcal{H}$ with eigenvalue σ such that $|\langle \sigma | v_{test} \rangle|$ is maximized subject to σ≥κ. The success probability of this procedure depends on the value of κ and the overlap of the input state with the subspace of maximally Harmonic states.

B. Quantum Supervised Learning of Harmony Operators

Quantum Harmony operators can also be learned in a supervised setting. This form of quantum Boltzmann training has not been considered in the literature and can be applied to general quantum Boltzmann training processes. For this reason, the possibility of hidden units in this form of training is also included. The weights on hidden units are in general harder to train in relative entropy training owing to the gradients no longer having a closed form.

Before starting, some notation is introduced. First, one can assume that the Hilbert space that the Harmony operator $\mathcal{H}$ acts on is of the form $\mathbb{C}^{2^n} \otimes \mathbb{C}^{2^h} \otimes \mathbb{C}^2$ corresponding to subsystems for the input $|v_k\rangle$, the hidden units used to compute Harmony, and a label qubit. In discriminative training of the Harmony operator, one needs to constrain the first register to be $|v_k\rangle$. One can achieve this by adding a penalty to the Harmony operator conditioned on the input $|v_k\rangle$. One can call this Harmony operator $H_k$ and denote the strength of these constraints λ.

$$H_k := \lambda |v_k\rangle\langle v_k| \otimes \mathbb{1} + \mathcal{H} \quad (22)$$

The constraint is rigidly enforced by taking the limit as λ→∞. Further, one can define a conditional Harmony operator $H'_k \in \mathbb{C}^{2^{h+1} \times 2^{h+1}}$ such that $$[H'_k]_{x,y} := \langle v_k | \sigma_{k,x} | \mathcal{H} | v_k \rangle | v_k \sigma_{k,y} \rangle \quad (23)$$

for a set of basis vectors $|\sigma_{k,j}\rangle$ spanning the hidden-state space. One can choose these vectors ultimately to diagonalize $H'_k$. One can also define for any operator $f(k)$ $$\langle\langle f(k) \rangle\rangle_k = \frac{Tr[f(k)|v_k\rangle\langle v_k| \otimes e^{H'_k}]}{Tr\, e^{H'_k}}, \quad \mathbb{E}_k(\cdot) = \frac{1}{K}\sum_{k=1}^{K} f(k). \quad (24)$$

Finally, for notational simplicity, a projector onto the label space that serves to test whether the label assigned to a vector by the Harmony operator is correct is introduced, which means that the label assigned to $|v_k\rangle$ is the value $l_k$ which is stored in the final qubit.

$$P_{l_k} = \mathbb{1} \otimes \mathbb{1} |l_k\rangle\langle l_k| \quad (25)$$

For example, if the sentence encoded in $|v_k\rangle$ is grammatical (maximally Harmonic) then $l_k=1$ and otherwise it is 0. A natural training objective for such discriminative training is the classification accuracy. (Cross entropy could be considered, but the matrix logarithm needed in this makes it difficult to find an analytic form for the gradient of the training objective function.) One can define this function as $$\lim_{\lambda\to\infty} \frac{1}{K}\sum_{k=1}^{K} Tr\left(\frac{P_{l_k} e^{H_k}}{Tr\, e^{H_k}}\right)$$

The gradients of this objective function are given below.

Theorem 4. Let $|v_k\rangle : 1, \ldots, K$ and $|l_k\rangle : 1, \ldots, K$ be vectors in $\mathbb{C}^{2^n}$ and $\mathbb{C}^2$ for positive integers K and n, let $\mathcal{H}(\omega) = \sum_{i=1}^{D} \omega_i \mathcal{H}_i : \mathbb{R}^D \to \mathbb{C}^{2^{n+h+1} \times 2^{n+h+1}}$ be a map such that for any $\omega \in \mathbb{R}^D$, $\mathcal{H}(\omega)$ is a quantum Harmony operator. One then has that if $[P_{l_k}, \mathcal{H}_i]=0$ for all k and i then $$\lim_{\lambda\to\infty} \partial_{\omega_i} \frac{1}{K}\sum_{k=1}^{K} Tr\left(\frac{P_{l_k} e^{H_k}}{Tr\, e^{H_k}}\right) = \mathbb{E}_k[\langle P_{l_k} \mathcal{H}_i\rangle_k - \langle P_{l_k}\rangle_k \langle \mathcal{H}_i\rangle_k].$$

Note that Harmonic Grammar operators such as (7) satisfy the conditions of this theorem also Boltzmann machines satisfy this theorem under the transformation $\mathcal{H} \to -H$ where H is the Hamiltonian operator used in the quantum Boltzmann machine.

Proof From the product rule, one has that $$\partial_{\omega_i} \frac{1}{K}\sum_{k=1}^{K} Tr\left(\frac{P_{l_k} e^{H_k}}{Tr\, e^{H_k}}\right) = \quad (26)$$

$$\frac{1}{K}\sum_{k=1}^{K}\left[Tr\left(\frac{P_{l_k} \partial_{\omega_i} e^{H_k}}{Tr\, e^{H_k}}\right) - Tr\left(\frac{P_{l_k} e^{H_k} Tr(\partial_{\omega_i} e^{H_k})}{(Tr\, e^{H_k})^2}\right)\right].$$

First note that from Duhamel's formula, the cyclic property of the trace and the assumption that $[P_{l_k}, \mathcal{H}_i]=0$ for all k, i $$Tr(P_{l_k} \partial_{\omega_i} e^{H_k}) = Tr\left(P_{l_k}\int_0^1 e^{H_k s}(\partial_{\omega_i} H_k) e^{H_k(1-s)} ds\right) \quad (27)$$

$$= Tr(P_{l_k}(\partial_{\omega_i} H_k)e^{H_k}) = Tr(P_{l_k}(\partial_{\omega_i}\mathcal{H})e^{H_k})$$

Using exactly the same argument $$Tr(\partial\omega_i e^{H_k}) = Tr((\partial\omega_i \mathcal{H})e^{H_k}) \quad (28)$$

Thus for any $\lambda \in \mathbb{R}_+$ $$\partial_{\omega_i}\frac{1}{K}\sum_{k=1}^{K} Tr\left(\frac{P_{l_k} e^{H_k}}{Tr\, e^{H_k}}\right) = \quad (29)$$

$$\mathbb{E}_k\left[\frac{Tr(P_{l_k}(\partial_{\omega_i}\mathcal{H})e^{H_k})}{Tr\, e^{H_k}} - Tr\left(\frac{P_{l_k} e^{H_k} Tr((\partial_{\omega_i}\mathcal{H})e^{H_k})}{(Tr\, e^{H_k})^2}\right)\right].$$

While the above expression holds for any valid constraint penalty λ, it is desirable to understand the performance of the Boltzmann machine in the limit where the strength of the penalty goes to infinity. Fortunately, one can argue about the form of the eigenvalues and eigenvectors of each $H_k$ in this limit. This can be achieved using degenerate perturbation theory.

One can now recount the argument from degenerate perturbation theory for completeness. Consider the state $|v_k\rangle \otimes |\sigma_{k,j}\rangle$ where $|\sigma_{k,j}\rangle$ is chosen to be an eigenstate of $H'_k = \sum_{x,y} |\sigma_{k,j}\rangle\langle\sigma_{k,x}|\langle v_k|\langle\sigma_{k,x}|\mathcal{H}|v_k\rangle|\sigma_{k,y}\rangle$. One then has that $$(\lambda|v_k\rangle\langle v_k|\otimes\mathbb{1})|v_k\rangle|\sigma_{k,j}\rangle = \lambda|v_k\rangle|\sigma_{k,j}\rangle \quad (30)$$

which implies that this is an eigenstate of the constraint operator if one neglects $\mathcal{H}$ in $H_k$. Formally, let one consider the true eigenvalue of the operator and assert a Taylor series in powers of $\lambda^{-1}$ for the eigenvalue and eigenvector of $H_k$.

Specifically, for a fixed eigenstate $|\psi_{k,j}\rangle$ with eigenvalue $E_{k,j}$ one has by taking the limit as $\lambda^{-1} \to 0$ that under the assumption that the eigenvalues and eigenvectors are chosen to be differentiable functions of $\lambda$, $|\omega_{k,j}\rangle = |v_k\rangle |\sigma_{k,j}\rangle + O(1/\lambda)$ and $E_{k,j} = \lambda + E_{k,j}^1 + O(1/\lambda)$ so $$\lambda |v_k\rangle \langle v_k | \otimes \mathbb{1} \, |v_k \mathcal{H} | \sigma_{k,j}\rangle + \mathcal{H} |v_k\rangle |\sigma_{k,j}\rangle = \lambda |v_k\rangle |\sigma_{k,j}\rangle + E_{k,j}^1 |v_k\rangle |\sigma_{k,j}\rangle + O(1/\lambda) \quad (31)$$

From taking the O(1) component of this equation, one sees that $E_{k,j}^1 = \langle v_k | \langle \sigma_{k,j} | \mathcal{H} | v_k \rangle | \sigma_{k,j}\rangle := \sigma_{k,j}$. Note that the choice of $|\sigma_{k,j}\rangle$ to be eigenvectors of $H'_k$ allows one to guarantee that the eigenvectors of $H_k$ can be expressed as a differentiable function of $\lambda^{-1}$. Thus to leading order in $\lambda^{-1}$, one can see that $$(|v_k\rangle\langle v_k| \otimes \mathbb{1}) H_k = \sum_j |v_k\rangle |\sigma_{k,j}\rangle \langle v_k| \langle \sigma_{k,j}| (\lambda + \sigma_{k,j}) \quad (32)$$

From this, one can reason about $e^{H_k}/\text{Tr } e^{H_k}$ in this limit.

$$\lim_{\lambda \to \infty} \frac{e^{H_k}}{\text{Tr } e^{H_k}} = \quad (33)$$

$$\lim_{\lambda \to \infty} \frac{\sum_j |v_k\rangle |\sigma_{k,j}\rangle \langle v_k| \langle \sigma_{k,j}| e^{\lambda + \sigma_{k,j}} + O(1/\lambda)}{\sum_j e^{\lambda + \sigma_{k,j}} + O(1/\lambda)} = \frac{|v_k\rangle\langle v_k| \otimes e^{H'_k}}{\text{Tr } e^{H'_k}}.$$

The result then follows from (29) and (24) after noting $\partial_{\omega_i} \mathcal{H} = \mathcal{H}_i$:

$$\mathbb{E}_k \left[ \frac{\text{Tr}(P_{\ell_k}(\partial_{\omega_i} \mathcal{H}) e^{H_k})}{\text{Tr } e^{H_k}} - \text{Tr}\left( \frac{P_{\ell_k} e^{H_k} \text{Tr } ((\partial_{\omega_i} \mathcal{H}) e^{H_k})}{(\text{Tr } e^{H_k})^2} \right) \right] = \quad (34)$$

$$\mathbb{E}_k \left[ \frac{\text{Tr}(P_{\ell_k} \mathcal{H}_i |v_k\rangle\langle v_k| \otimes e^{H'_k})}{\text{Tr } e^{H'_k}} - \text{Tr}\left( \frac{P_{\ell_k} |v_k\rangle\langle v_k| \otimes e^{H'_k} \text{Tr } \mathcal{H}_i |v_k\rangle\langle v_k| \otimes e^{H'_k}}{(\text{Tr } e^{H'_k})^2} \right) \right] =$$

$$\mathbb{E}_k \left[ \langle P_{\ell_k} \mathcal{H}_i \rangle_k - \langle P_{\ell_k} \rangle_k \langle \mathcal{H}_i \rangle_k \right]$$

The above result shows that an elementary expression for the gradient exists that can be expressed in terms of constrained expectation values of the terms in the Harmony operator.

C. Quantum Complexity of Learning Harmony Operators

This disclosure now turns to the computational complexity of a supervised learning procedure exploiting Theorem 4. It can be noted that Harmonic Grammar operators like (7) obey the conditions of this theorem, although under a different decomposition of $\mathcal{H}$ into a sum of operators $\mathcal{H}_k$ than that explicitly given in (7). In particular, the operators n given in that equation are not unitary. This is because the number operators count the occupation of a particular mode in the Fock representation and as a result obey $n \cdot |0\rangle = 0$, which is manifestly non-unitary because 0 is not a unit vector but $|0\rangle$ is. One can, however, address this by expressing $n_{(\cdot)}$ in the Pauli-basis. In particular $n_{(\cdot)} = (\mathbb{1} - Z_{(\cdot)})/2$ where $Z_{(\cdot)}$ is the Pauli-Z operation acting on the same mode. Since $Z = Z^\dagger$ and $Z^2 = \mathbb{1}$ after making this substitution it is clear that one can re-write the Harmony operator to conform to the assumptions of Theorem 4.

Corollary 1. Under the assumptions of Theorem 4, with the further assumption that $\mathcal{H}_i$ is unitary and Hermitian for each $\mathcal{H}_i$ in the Harmony operator, and given access to a unitary oracle $F(k): |0\rangle \to |v_k\rangle |1_k\rangle$ and a state preparation oracle $G_k$ that prepares copies of $e^{H_k}/\text{Tr } e^{H_k}$, the number of queries to these oracles that are needed to compute a vector with components $\mathbb{E}_k[\langle P_{\ell_k} \mathcal{H}_i \rangle_k - \langle P_{\ell_k} \rangle_k \langle \mathcal{H}_i \rangle_k]$ within error $\epsilon$ in the Euclidean distance with probability at least $\frac{2}{3}$ is in $O(D^2/\epsilon^2)$. If the process $G_k$ is defined such that $G_k|k\rangle|0\rangle = |k\rangle|\psi_k\rangle$ where $|\psi_k\rangle$ is a purification of $e^{H_k}/\text{Tr } e^{H_k}$ then the query complexity can be reduced to $O(D^2/\epsilon)$.

Proof. The algorithm for achieving this is constructive. First, it is straightforward to see that with two queries to F it is possible to construct a gate U that marks the state $|1_k\rangle$ —that is to say that $U|\psi\rangle = -|\psi\rangle$ if and only if $\psi = 1_k$, and otherwise U acts as the identity. By applying the Hadamard test with this unitary and using a state generated by the oracle $G_k$ as input it is easy to see that you can sample from a random variable with expectation value $\frac{1}{2} + \text{Tr}(|v_k\rangle \langle v_k| \otimes e^{H_k} U)/(2\text{Tre}^{H_k}) = 1 - \text{Tr}(|v_k\rangle \langle v_k| \otimes e^{H_k} P_{\ell_k})/2\text{Tre}^{H_k}$. The variance of this random variable is at most 1 because the norm of any projector is at most 1. Similarly, because $\mathcal{H}_i$ is unitary, one can use the Hadamard test in the same way to sample from a random variable with mean $$\frac{1}{2}\left(1 + \text{Tr}\left(\frac{|v_k\rangle\langle v_k| \otimes e^{H'_k} \mathcal{H}_i}{\text{Tr } e^{H'_k}}\right)\right) = \frac{1}{2} + \frac{\langle \mathcal{H}_i \rangle_k}{2} \quad (35)$$

and variance at most 1. Finally, by applying $U\mathcal{H}_i = \mathcal{H}_i - 2P_{\ell_k}\mathcal{H}_i$ to the state yielded by $G_k$, one can sample from a random variable with mean $\frac{1}{2} + \langle \mathcal{H}_i \rangle_k / 2 - \langle P_{\ell_k} \mathcal{H}_i \rangle_k$ with variance at most 1. From the additive property of variance the number of samples needed to estimate each component of the gradient within error $\delta$ with probability at least $\frac{2}{3}$ is at most $O(1/\delta^2)$ repetitions of the circuit. In order to guarantee that the error in the Euclidean norm is at most $\epsilon$ it suffices to take $\delta = \epsilon/D$. The result then follows for the case where $G_k$ yields copies of a Gibbs state.

If a purified Gibbs state oracle is provided then by preparing a uniform superposition over the K elements a state of the form $$\frac{1}{\sqrt{K}} \sum_k |k\rangle |\psi_k\rangle$$

can be prepared. If one assumes that $|\psi_k\rangle \in A \otimes B$ where A is the Hilbert space corresponding to the domain of $H_k'$ and B is an auxiliary Hilbert space and if one defines K to be the Hilbert space used for the control register for $G_k$ then one sees that $$\text{Tr}_{K,B}\left(\frac{1}{\sqrt{K}} \sum_k |k\rangle|\psi_k\rangle\right) = \mathbb{E}_k\left(\frac{e^{H'_k}}{\text{Tre}^{H'_k}}\right) \quad (36)$$

Thus by repeating the above steps involving the Hadamard tests, one can create a unitary circuit such that the measurement of an individual qubit yield a random variables with means $$\mathbb{E}_k\left(\frac{\langle\mathcal{H}_i\rangle_k}{2}\right), \mathbb{E}_k\left(\frac{\langle\mathcal{H}_i\rangle_k}{2} - \langle P_{\ell_k}\mathcal{H}_i\rangle_k\right) \quad (37)$$

and variances at most 1. Finally, by using amplitude estimation these means can be extracted within error $\epsilon/D$ using $O(D/\epsilon)$ applications of the above protocol. See Gilles Brassard, Peter Hoyer, Michele Mosca, and Alain Tapp, "Quantum amplitude amplification and estimation", Contemporary Mathematics, 305:53-74 (2002). This yields one component of the gradient and as there are D components the total query complexity is $O(D^3/\epsilon)$ as claimed.

The following lemma is well known and a proof can be found in Stephen Boyd and Lieven Vandenberghe, "Convex optimization," Cambridge University Press, 2004.

Lemma 2. Suppose that $f$ is a strongly convex function that obeys $(f(x')-f(x)-\nabla f(x)\cdot(x'-x))\|x'-x\|^{-1} \in [\mu/2, L/2]$ and achieves its global minimum at $x=x^*$. If the rate of descent r is chosen such that $r=1/L$ then at iteration t of gradient descent the distance from the optimum parameters obeys $$\|x(t) - x^*\| \leq \left(1 - \frac{\mu}{L}\right)^t \|x(0) - x^*\| \quad (38)$$

This implies that for every $\epsilon>0$ there exists $t \in O((L/\mu)\log(\|x(0)-x^*\|/\epsilon))$ such that $\|x(t)-x^*\|\leq\epsilon$.

Using Lemma 2, one can then bound the number of iterations of gradient descent that one will need to find a local optima for the training objective function.

Theorem 5. Let $$f(\omega) := \lim_{\lambda\to\infty} \frac{1}{K}\sum_{k=1}^{K} Tr\left(\frac{P_{\ell_k} e^{H_k}}{Tr\, e^{H_k}}\right)$$

such that $f$ satisfies the requirements of Lemma 2. If $\omega^*$ represents the optimal weights for the Harmony operator $\mathcal{H}$ within a compact region where $f$ is strongly convex and one can assume there exists $\mathcal{L} \in \mathbb{R}$ such that $\|\nabla f(\omega) - \nabla f(\omega')\| \leq \mathcal{L}\|\omega - \omega'\| \forall \omega, \omega'$ then under the assumptions of Corollary 1 the number of queries to a method that prepares the training data and prepares the data to find $\omega'$ such that $\|w'-\omega^*\|\leq\epsilon$ is in $$\tilde{O}\left(\frac{D_2}{\epsilon^2}\left(\frac{\|\omega^*-\omega_0\|}{\epsilon}\right)^{\frac{\log(1+\mathcal{L}/L)}{\log(L/(L-\mu))}}\right);$$

here one can assume $\mathcal{L}$, L, and $\mu$ are constants and $\tilde{O}(\cdot)$ means $O(\cdot)$ but neglecting sub-polynomial factors.

Proof Let $\widetilde{\nabla f}$ be the numerical approximation to the gradient taken at a point and let $\tilde{\omega}_p$ be the approximation to $\omega_p$ that arises due to inexact gradient calculation. By assumption the update rule used in the gradient ascent algorithm is $\omega_{p+1}=\omega_p+\nabla f(\omega_p)/L$ and $\tilde{\omega}_{p+1}=\tilde{\omega}_p+\widetilde{\nabla f}(\tilde{\omega}_p)/L$ One then has that if $\omega_0=\tilde{\omega}_0$ then for any $p>0$ one has from the triangle inequality that if the gradients are computed such that $\|\nabla f(\tilde{\omega}_p)-\widetilde{\nabla f}(\tilde{\omega}_p)\|\leq\delta$ $$\|\omega_{p+1}-\tilde{\omega}_{p+1}\| \leq \quad (39)$$

$$\|\omega_p - \tilde{\omega}_p\| + \frac{1}{L}\|\nabla f(\omega_p) - \nabla f(\tilde{\omega}_p)\| + \frac{1}{L}\|\nabla f(\tilde{\omega}_p) - \widetilde{\nabla f}(\tilde{\omega}_p)\| \leq$$

$$\left(1 + \frac{\mathcal{L}}{L}\right)\|\omega_p - \tilde{\omega}_p\| + \frac{\delta}{L}$$

It then follows inductively from the initial condition if $\omega_0=\tilde{\omega}_0$ that $$\|\omega_k - \tilde{\omega}_k\| \leq \frac{\delta}{L}\sum_{p=0}^{k-1}\left(1+\frac{\mathcal{L}}{L}\right)^p = \frac{\delta}{\mathcal{L}}\left(\left(1+\frac{\mathcal{L}}{L}\right)^k - 1\right) \leq \frac{\delta}{\mathcal{L}}\left(1+\frac{\mathcal{L}}{L}\right)^k \quad (40)$$

One therefore also have from the triangle inequality that $$\|\omega^* - \tilde{\omega}_k\| \leq \|\omega^* - \omega_k\| + \|\omega_k - \tilde{\omega}_k\| \leq \quad (41)$$

$$\left(1-\frac{\mu}{L}\right)^k \|\omega_0 - \omega^*\| + \frac{\delta}{\mathcal{L}}\left(1+\frac{\mathcal{L}}{L}\right)^k$$

In order to ensure that the overall error is at most $\epsilon$ one can choose both contributions to be at most $\epsilon/2$. Elementary algebra then shows that it suffices to choose $$k = \quad (42)$$

$$\left\lceil\frac{\log\left(\frac{2\|\omega_0-\omega^*\|}{\epsilon}\right)}{\log\left(\frac{L}{L-\mu}\right)}\right\rceil \leq 1 + \frac{\log\left(\frac{2\|\omega_0-\omega^*\|}{\epsilon}\right)}{\log\left(\frac{L}{L-\mu}\right)} \in O\left(\log\left(\frac{\|\omega^*-\omega_0\|}{\epsilon}\right)\right),$$

$$\delta = \frac{\epsilon\mathcal{L}}{2}\left(1+\frac{\mathcal{L}}{L}\right)^{-1}\left(\frac{\epsilon}{2\|\omega^*-\omega_0\|}\right)^{\frac{\log(1+\mathcal{L}/L)}{\log(L/(L-\mu))}} \in O\left(\frac{\epsilon^{1+\frac{\log(1+\mathcal{L}/L)}{\log(L/(L-\mu))}}}{\|\omega^*-\omega_0\|^{\frac{\log(1+\mathcal{L}/L)}{\log(L/(L-\mu))}}}\right),$$

where it has been assumed $\mathcal{L}$, L, and $\mu$ are the constants defined above.

If one uses the result of Corollary 1 then the total number of iterations needed is $O(D^2/\delta^2)$. However, the probability of success for this process is at least ⅔. This means that, if the probability of each derivative failing can be reduced to $1/3k$, then the probability of success of the protocol is at least ⅔. From the Chernoff bound, this can be achieved using $O(\log(k))$ repetitions of each gradient calculation. Thus the total number of samples scales as $$N_{samp} \in O(k\log(k)D^2/\delta^2) \subseteq \tilde{O}(kD^2/\delta^2) \quad (43)$$

Hence it follows from (42) and (43) that the overall number of samples needed for the entire protocol scales as $$N_{samp} \in \tilde{O}\left(\frac{D^2}{\epsilon^2}\left(\frac{\|\omega^*-\omega_0\|}{\epsilon}\right)^{2\frac{\log(1+\mathcal{L}/L)}{\log(L/(L-\mu))}}\right) \quad (44)$$

This result shows that the number of samples needed in the training process scales inverse polynomially with the target uncertainty, and this holds even under the worst case assumption that deviations in the gradient calculations lead to exponentially diverging solutions. Also, as this result does not explicitly depend on the form of the function $f$ (apart from guarantees about its convexity and smoothness) the result also holds generally for supervised training of quantum Boltzmann machines.

IX. Further Embodiments

In this section, example methods for performing the disclosed technology are disclosed. The particular embodiments described should not be construed as limiting, as the disclosed method acts can be performed alone, in different orders, or at least partially simultaneously with one another. Further, any of the disclosed methods or method acts can be performed with any other methods or method acts disclosed herein.

Figure 6:
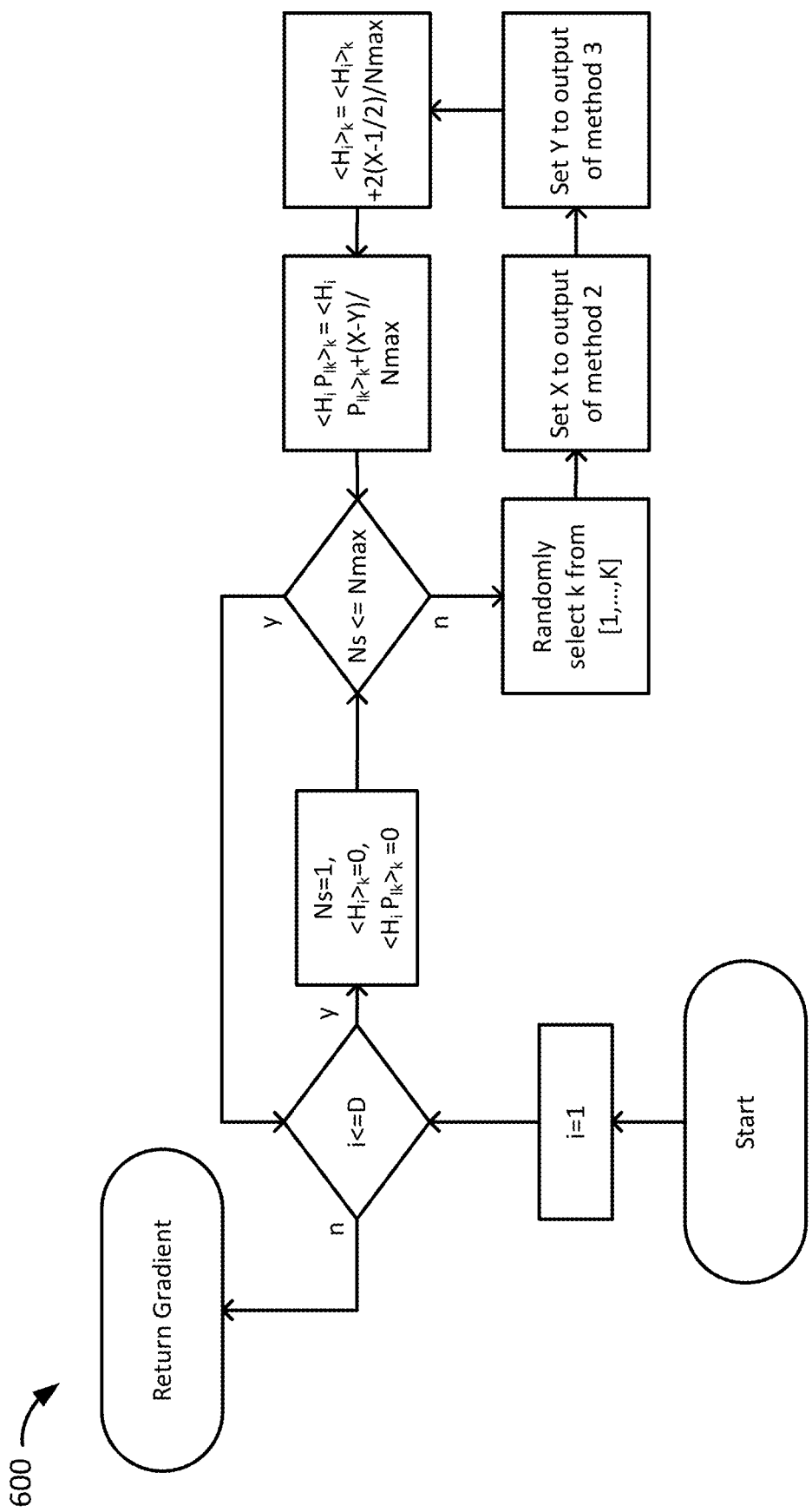

FIG. 6 is a flow chart showing an example method 600 for finding a gradient of parameters of the Boltzmann machine that are used to model the quantum data that the machine learning algorithm, as disclosed herein, is trained with. The expression in this example is described at Theorem 4 for performing a linear combination of unitaries. The illustrated procedure is mostly classical but includes a few quantum components—namely, finding the two expectation values.

Figure 7:
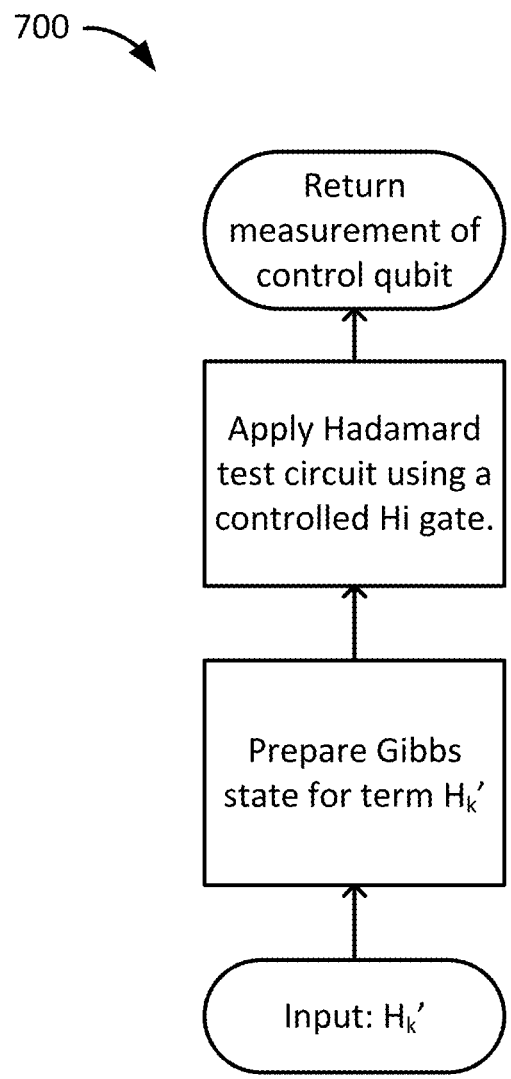
FIGS. 7-8 show example processes for finding expectation values, as described herein.
Figure 8:
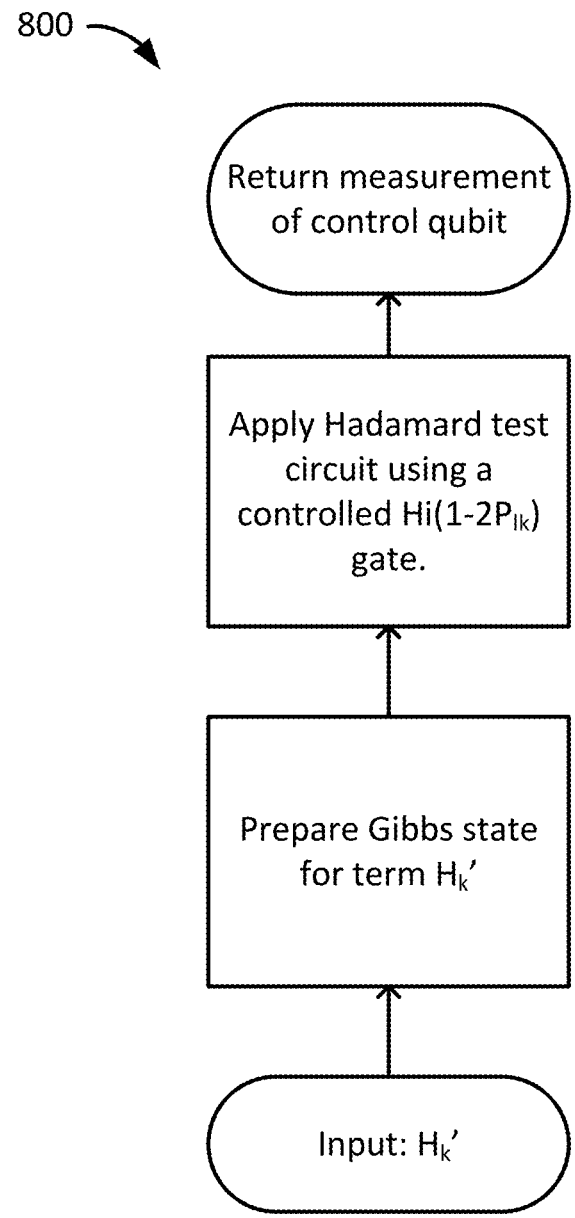

Example processes for finding those expectation values are illustrated in example methods 700 and 800 of FIG. 7 and FIG. 8. The method of using the "Hadamard Test" to learn these expectation values is disclosed with particularity in Corollary 1 of this disclosure.

Figure 13:
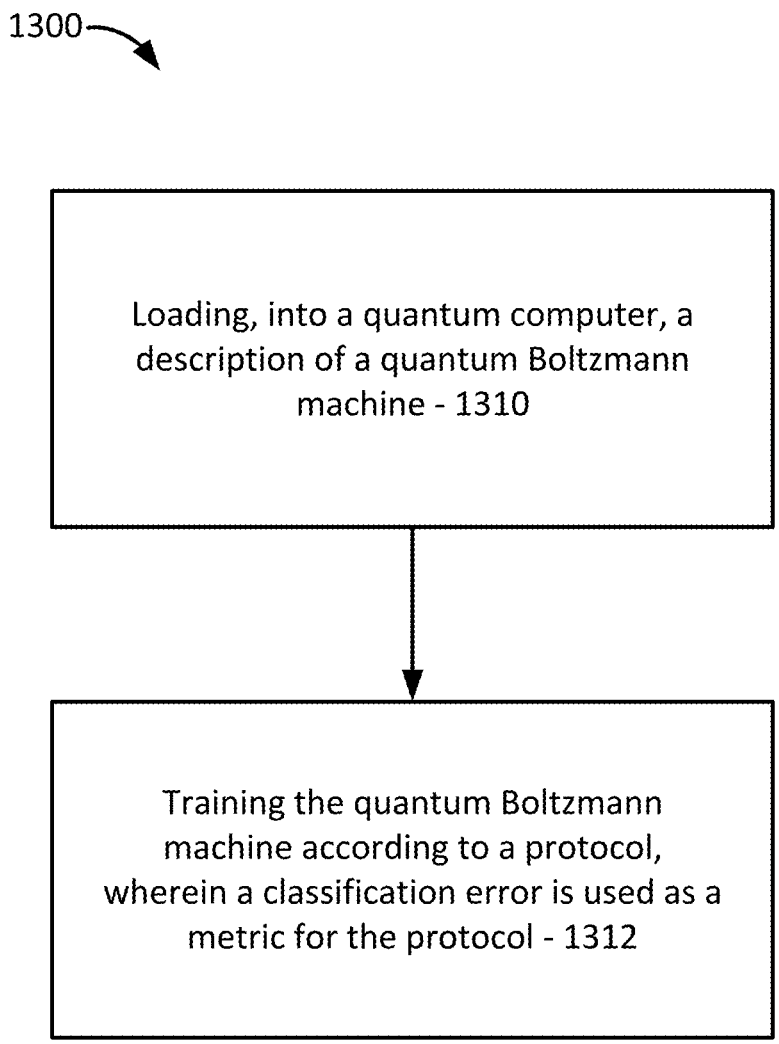
FIG. 13 is a flow chart showing another example embodiment of the disclosed technology.

FIG. 13 is a flow chart showing an example 1300 method for operating a quantum computer.

At 1310, a description of a quantum Boltzmann machine is loaded into the quantum computer.

At 1312, the quantum Boltzmann machine is trained according to a protocol, wherein a classification error is used as a metric for the protocol.

In further implementations, the method comprises using penalty functions to clamp visible units of the Boltzmann machine to visible units input into the protocol.

In certain embodiments, the training is performed with a constraint term in a Hamiltonian describing the Boltzmann machine. In particular implementations, the Hamiltonian commutes projectors onto a label subspace. In some embodiments, the description of the quantum Boltzmann machine is in a Fock-space representation.

In particular embodiments, the quantum computer is a topological quantum computing device (e.g., a topological quantum computing device operating using Majorana zero modes).

X. Example Computing Environments

Figure 9:
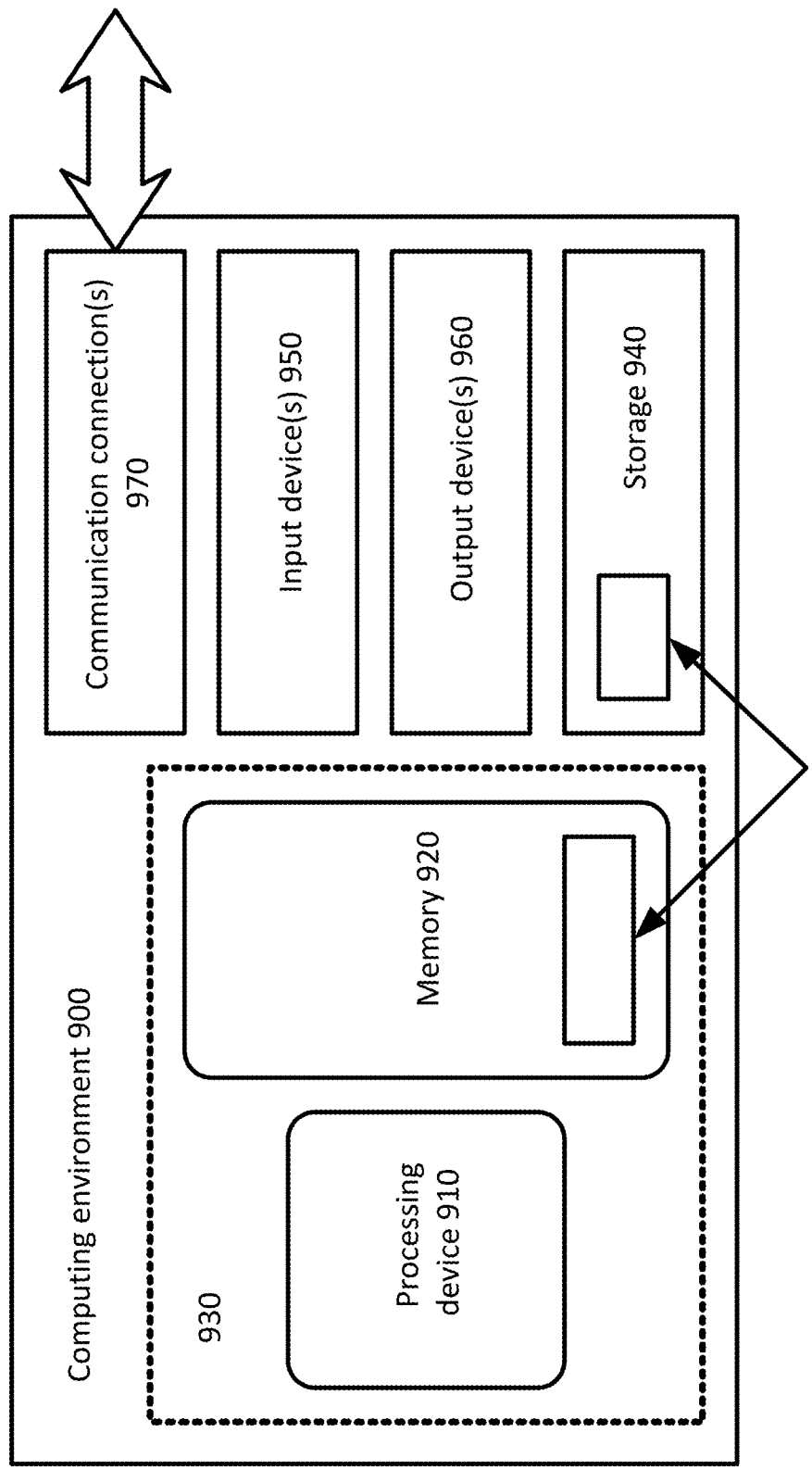
FIG. 9 illustrates a generalized example of a suitable classical computing environment in which aspects of the described embodiments can be implemented.

FIG. 9 illustrates a generalized example of a suitable classical computing environment 900 in which aspects of the described embodiments can be implemented. The computing environment 900 is not intended to suggest any limitation as to the scope of use or functionality of the disclosed technology, as the techniques and tools described herein can be implemented in diverse general-purpose or special-purpose environments that have computing hardware.

With reference to FIG. 9, the computing environment 900 includes at least one processing device 910 and memory 920. In FIG. 9, this most basic configuration 930 is included within a dashed line. The processing device 910 (e.g., a CPU or microprocessor) executes computer-executable instructions. In a multi-processing system, multiple processing devices execute computer-executable instructions to increase processing power. The memory 920 may be volatile memory (e.g., registers, cache, RAM, DRAM, SRAM), non-volatile memory (e.g., ROM, EEPROM, flash memory), or some combination of the two. The memory 920 stores software 980 implementing tools for performing any of the disclosed techniques for operating a quantum computer to perform any of the quantum Boltzmann techniques as described herein. The memory 920 can also store software 980 for synthesizing, generating, or compiling quantum circuits for performing the described quantum language processing techniques as described herein.

The computing environment can have additional features. For example, the computing environment 900 includes storage 940, one or more input devices 950, one or more output devices 960, and one or more communication connections 970. An interconnection mechanism (not shown), such as a bus, controller, or network, interconnects the components of the computing environment 900. Typically, operating system software (not shown) provides an operating environment for other software executing in the computing environment 900, and coordinates activities of the components of the computing environment 900.

The storage 940 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 900. The storage 940 can also store instructions for the software 980 implementing any of the disclosed quantum language processing techniques. The storage 940 can also store instructions for the software 980 for generating and/or synthesizing any of the described techniques, systems, or quantum circuits.

The input device(s) 950 can be a touch input device such as a keyboard, touchscreen, mouse, pen, trackball, a voice input device, a scanning device, or another device that provides input to the computing environment 900. The output device(s) 960 can be a display device (e.g., a computer monitor, laptop display, smartphone display, tablet display, netbook display, or touchscreen), printer, speaker, or another device that provides output from the computing environment 900.

The communication connection(s) 970 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, techniques for controlling a quantum computing device to perform phase arithmetic, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 920 and/or storage 940, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 10:
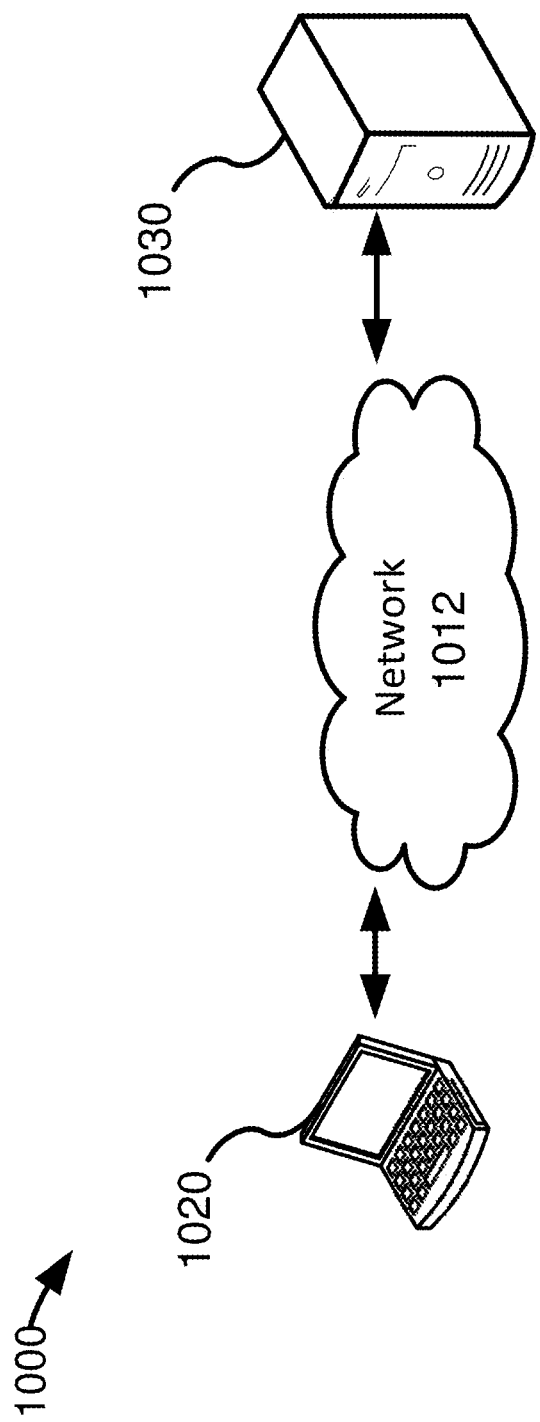
FIG. 10 is an example of a possible network topology (e.g., a client-server network) for implementing a system according to the disclosed technology.

An example of a possible network topology 1000 (e.g., a client-server network) for implementing a system according to the disclosed technology is depicted in FIG. 10. Networked computing device 1020 can be, for example, a computer running a browser or other software connected to a network 1012. The computing device 1020 can have a computer architecture as shown in FIG. 9 and discussed above. The computing device 1020 is not limited to a traditional personal computer but can comprise other computing hardware configured to connect to and communicate with a network 1012 (e.g., smart phones, laptop computers, tablet computers, or other mobile computing devices, servers, network devices, dedicated devices, and the like). Further, the computing device 1020 can comprise an FPGA or other programmable logic device. In the illustrated embodiment, the computing device 1020 is configured to communicate with a computing device 1030 (e.g., a remote server, such as a server in a cloud computing environment) via a network 1012. In the illustrated embodiment, the computing device 1020 is configured to transmit input data to the computing device 1030, and the computing device 1030 is configured to implement a technique for controlling a quantum computing device to perform any of the quantum Boltzmann techniques according to any of the disclosed embodiments and/or a circuit generation/compilation/synthesis technique for generating quantum circuits for performing any of the techniques disclosed herein. The computing device 1030 can output results to the computing device 1020. Any of the data received from the computing device 1030 can be stored or displayed on the computing device 1020 (e.g., displayed as data on a graphical user interface or web page at the computing devices 1020). In the illustrated embodiment, the illustrated network 1012 can be implemented as a Local Area Network ("LAN") using wired networking (e.g., the Ethernet IEEE standard 802.3 or other appropriate standard) or wireless networking (e.g., one of the IEEE standards 802.11a, 802.11b, 802.11g, or 802.11n or other appropriate standard). Alternatively, at least part of the network 1012 can be the Internet or a similar public network and operate using an appropriate protocol (e.g., the HTTP protocol).

Figure 11:
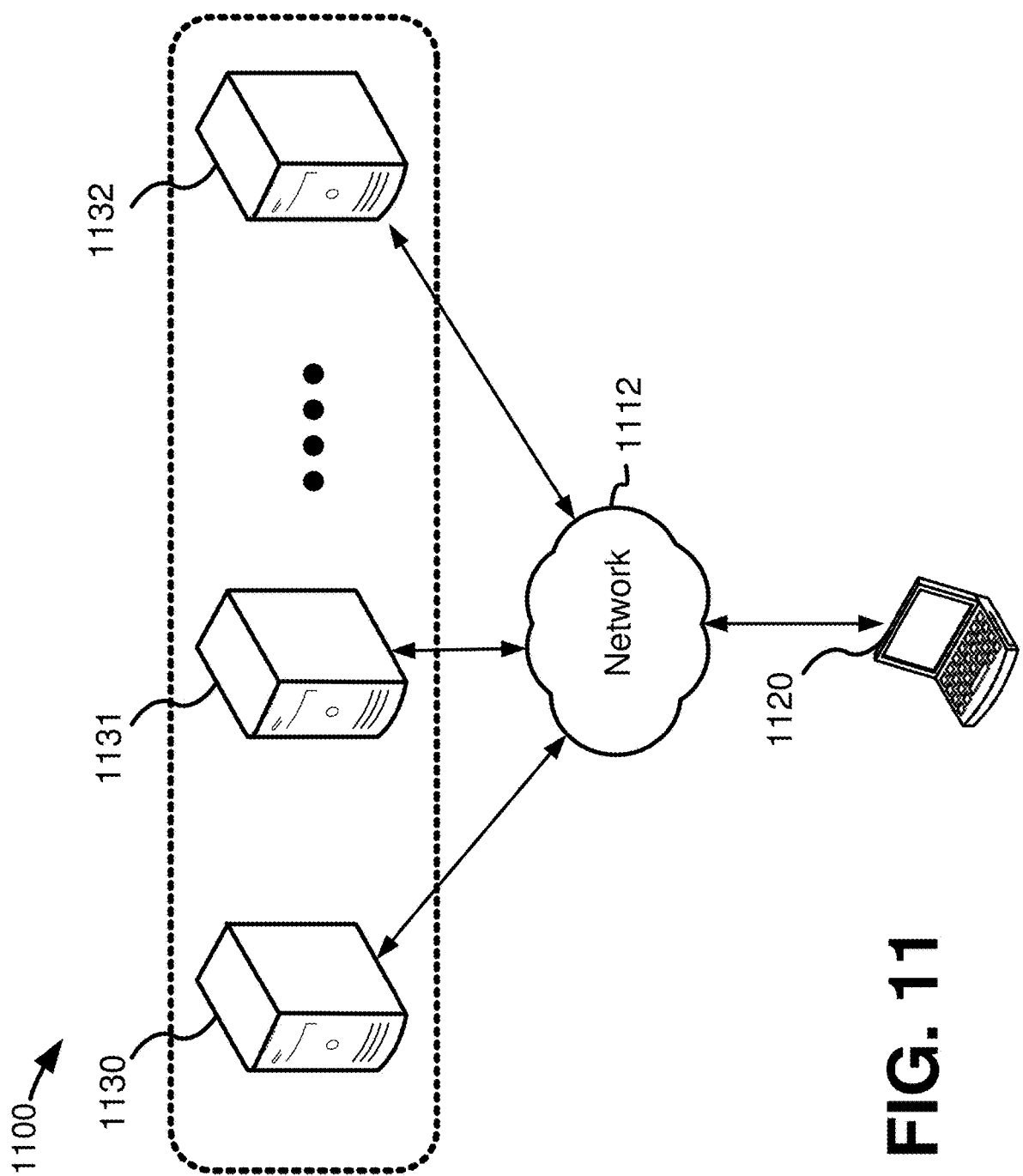
FIG. 11 is another example of a possible network topology (e.g., a distributed computing environment) for implementing a system according to the disclosed technology.

Another example of a possible network topology 1100 (e.g., a distributed computing environment) for implementing a system according to the disclosed technology is depicted in FIG. 11. Networked computing device 1120 can be, for example, a computer running a browser or other software connected to a network 1112. The computing device 1120 can have a computer architecture as shown in FIG. 9 and discussed above. In the illustrated embodiment, the computing device 1120 is configured to communicate with multiple computing devices 1130, 1131, 1132 (e.g., remote servers or other distributed computing devices, such as one or more servers in a cloud computing environment) via the network 1112. In the illustrated embodiment, each of the computing devices 1130, 1131, 1132 in the computing environment 1100 is used to perform at least a portion of a technique for controlling a quantum computing device to perform any of the disclosed embodiments and/or a circuit generation/compilation/synthesis technique for generating quantum circuits for performing any of the techniques disclosed herein. In other words, the computing devices 1130, 1131, 1132 form a distributed computing environment in which aspects of the techniques for performing any of the techniques in a quantum computing device as disclosed herein and/or quantum circuit generation/compilation/synthesis processes are shared across multiple computing devices. The computing device 1120 is configured to transmit input data to the computing devices 1130, 1131, 1132, which are configured to distributively implement such as process, including performance of any of the disclosed methods or creation of any of the disclosed circuits, and to provide results to the computing device 1120. Any of the data received from the computing devices 1130, 1131, 1132 can be stored or displayed on the computing device 1120 (e.g., displayed as data on a graphical user interface or web page at the computing devices 1120). The illustrated network 1112 can be any of the networks discussed above with respect to FIG. 10.

Figure 12:
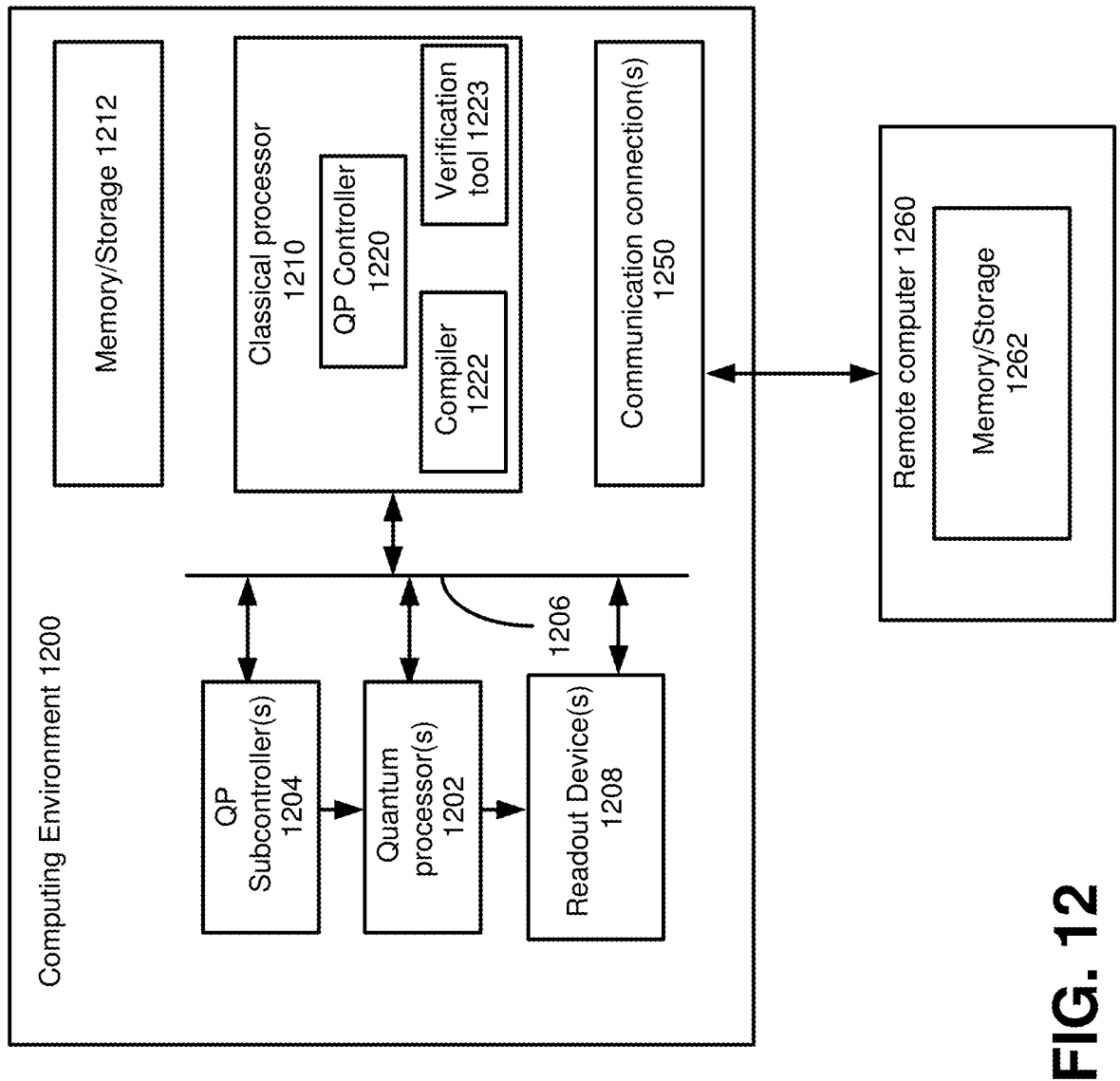
FIG. 12 shows an exemplary system for implementing the disclosed technology.

With reference to FIG. 12, an exemplary system for implementing the disclosed technology includes computing environment 1200. In computing environment 1200, a compiled quantum computer circuit description (including quantum circuits for performing any of the disclosed techniques as disclosed herein) can be used to program (or configure) one or more quantum processing units such that the quantum processing unit(s) implement the circuit described by the quantum computer circuit description.

The environment 1200 includes one or more quantum processing units 1202 and one or more readout device(s) 1208. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes).

The precompiled quantum circuits, including any of the disclosed circuits, can be sent into (or otherwise applied to) the quantum processing unit(s) via control lines 1206 at the control of quantum processor controller 1220. The quantum processor controller (QP controller) 1220 can operate in conjunction with a classical processor 1210 (e.g., having an architecture as described above with respect to FIG. 9) to implement the desired quantum computing process. In the illustrated example, the QP controller 1220 further implements the desired quantum computing process via one or more QP subcontrollers 1204 that are specially adapted to control a corresponding one of the quantum processor(s) 1202. For instance, in one example, the quantum controller 1220 facilitates implementation of the compiled quantum circuit by sending instructions to one or more memories (e.g., lower-temperature memories), which then pass the instructions to low-temperature control unit(s) (e.g., QP subcontroller(s) 1204) that transmit, for instance, pulse sequences representing the gates to the quantum processing unit(s) 1202 for implementation. In other examples, the QP controller(s) 1220 and QP subcontroller(s) 1204 operate to provide appropriate magnetic fields, encoded operations, or other such control signals to the quantum processor(s) to implement the operations of the compiled quantum computer circuit description. The quantum controller(s) can further interact with readout devices 1208 to help control and implement the desired quantum computing process (e.g., by reading or measuring out data results from the quantum processing units once available, etc.)

With reference to FIG. 12, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein). The compilation can be performed by a compiler 1222 using a classical processor 1210 (e.g., as shown in FIG. 9) of the environment 1200 which loads the high-level description from memory or storage devices 1212 and stores the resulting quantum computer circuit description in the memory or storage devices 1212.

In other embodiments, compilation and/or verification can be performed remotely by a remote computer 1260 (e.g., a computer having a computing environment as described above with respect to FIG. 9) which stores the resulting quantum computer circuit description in one or more memory or storage devices 1262 and transmits the quantum computer circuit description to the computing environment 1200 for implementation in the quantum processing unit(s) 1202. Still further, the remote computer 1200 can store the high-level description in the memory or storage devices 1262 and transmit the high-level description to the computing environment 1200 for compilation and use with the quantum processor(s). In any of these scenarios, results from the computation performed by the quantum processor(s) can be communicated to the remote computer after and/or during the computation process. Still further, the remote computer can communicate with the QP controller(s) 1220 such that the quantum computing process (including any compilation, verification, and QP control procedures) can be remotely controlled by the remote computer 1260. In general, the remote computer 1260 communicates with the QP controller(s) 1220, compiler/synthesizer 1222, and/or verification tool 1223 via communication connections 1250.

In particular embodiments, the environment 1200 can be a cloud computing environment, which provides the quantum processing resources of the environment 1200 to one or more remote computers (such as remote computer 1260) over a suitable network (which can include the internet).

XI. Concluding Remarks

In this work, the question of how one can best fit certain problems in computational linguistics onto quantum computers was considered. In doing so, embodiments of a new formalism for representing language processing called Fock-space representations were presented that have the advantage of being easily encoded in a small number of qubits (unlike tensor-product representations). A formalism for harmonic grammars in this representation were then developed, including ways to generalize it beyond the case of classical grammars. This quantum case disclosed is related to quantum error correcting codes and furthermore cannot be efficiently solved on a classical computer unless P=BQP meaning that the results can potentially offer exponential speedups for evaluating quantum Harmony operators unless classical computers are at most polynomially weaker than quantum computers. In doing so, new methods for training quantum Boltzmann machines were also provided that have independent value over the current applications to language processing. Finally, the utility of Fock-space representations was illustrated by showing how they, in concert with classical optimization methods, can be used to parse sentences in relatively complicated grammars very quickly on ordinary computers.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method of operating a quantum computer, comprising:
    loading, into the quantum computer, a description of a quantum Boltzmann machine comprising both visible and hidden units, wherein the description includes a constraint term in a Hamiltonian that commutes projectors onto a label subspace;
    performing supervised training of the quantum Boltzmann machine according to a protocol for classifying labeled vectors, wherein:
        a classification accuracy is used as an objective for the protocol;
        penalty functions are used to clamp visible units of the quantum Boltzmann machine to be conditioned on input registers of the protocol; and
        weights for hidden units are trained using a constraint penalty corresponding to the visible units, hidden units, and a labeled qubit, the constraint penalty enforced by taking a limit as a strength of the constraint penalty approaches infinity to learn a quantum Harmony operator;
    assigning labels to vectors using the quantum Harmony operator;
    determining whether the labels assigned to the vectors by the quantum Harmony operator are correct; and
    indicating an accuracy of the assigned labels based on the strength of the constraint penalty.

2. The method of claim 1, wherein the training protocol trains the quantum Boltzmann machine to learn quantum Harmony operators that describe a language, wherein a description of the language is provided in a Fock-space representation.

3. The method of claim 1, wherein the quantum computer is a topological quantum computing device.

4. The method of claim 3, wherein the topological quantum computing device operates using Majorana zero modes.

5. One or more computer-readable media storing computer-executable instructions which when executed by a classical computer cause the classical computer to perform a method, the method comprising:
    loading, into a quantum computer, a description of a quantum Boltzmann machine comprising both visible and hidden units, wherein the description includes a constraint term in a Hamiltonian that commutes projectors onto a label subspace;

performing supervised training of the quantum Boltzmann machine implemented by the quantum computer according to a protocol for classifying labeled vectors, wherein:
- a classification accuracy is used as an objective for the protocol;
- penalty functions are used to clamp visible units of the quantum Boltzmann machine to be conditioned on input registers of the protocol; and
- weights for hidden units are trained using a constraint penalty corresponding to the visible units, hidden units, and a labeled qubit, the constraint penalty enforced by taking a limit as a strength of the constraint penalty approaches infinity to learn a quantum Harmony operator;

assigning labels to vectors using the quantum Harmony operator;

determining whether the labels assigned to the vectors by the quantum Harmony operator are correct; and indicating an accuracy of the assigned labels based on the strength of the constraint penalty.

6. The one or more computer-readable media of claim 5, wherein the training protocol trains the quantum Boltzmann machine to learn quantum Harmony operators that describe a language, wherein a description of the language is provided in a Fock-space representation.

7. The one or more computer-readable media of claim 5, wherein the quantum computer is a topological quantum computing device using Majorana zero modes.

8. A system, comprising:
- a quantum computing system; and
- a classical computer configured to control the quantum computing system according to a method, the method comprising:
  - loading, in the quantum computing system, a description of a quantum Boltzmann machine comprising both visible and hidden units, wherein the description includes a constraint term in a Hamiltonian that commutes projectors onto a label subspace;
  - performing supervised training of the quantum Boltzmann machine implemented by the quantum computing system according to a protocol for classifying labeled vectors, wherein:
    - a classification accuracy is used as an objective for the protocol;
    - penalty functions are used to clamp visible units of the quantum Boltzmann machine to be conditioned on input registers of the protocol; and
    - weights for hidden units are trained using a constraint penalty corresponding to the visible units, hidden units, and a labeled qubit, the constraint penalty enforced by taking a limit as a strength of the constraint penalty approaches infinity to learn a quantum Harmony operator;
  - assigning labels to vectors using the quantum Harmony operator;
  - determining whether the labels assigned to the vectors by the quantum Harmony operator are correct; and
  - indicating an accuracy of the assigned labels based on the strength of the constraint penalty.

9. The system of claim 8, wherein training protocol trains the quantum Boltzmann machine to learn quantum Harmony operators that describe a language, wherein a description of the language is provided in a Fock-space representation.

10. The system of claim 8, wherein the quantum computing system is a topological quantum computing device.

11. The system of claim 10, wherein the topological quantum computing device operates using Majorana zero modes.

* * * * *